(12) United States Patent
Takahashi

(10) Patent No.: US 9,602,040 B2
(45) Date of Patent: Mar. 21, 2017

(54) APPARATUS FOR CONTROLLING FIRST AND SECOND ROTARY ELECTRIC MACHINES

(71) Applicant: DENSO CORPORATION, Kariya, Aichi-pref. (JP)

(72) Inventor: Shigenori Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/868,060

(22) Filed: Sep. 28, 2015

(65) Prior Publication Data

US 2016/0094163 A1    Mar. 31, 2016

(30) Foreign Application Priority Data

Sep. 26, 2014 (JP) .................................. 2014-196450

(51) Int. Cl.
| | |
|---|---|
| *G05B 1/03* | (2006.01) |
| *H02P 27/08* | (2006.01) |
| *H02P 6/00* | (2016.01) |
| *H02P 5/74* | (2006.01) |
| *B60L 11/12* | (2006.01) |

(Continued)

(52) U.S. Cl.
CPC .............. *H02P 27/08* (2013.01); *B60L 11/123* (2013.01); *B60L 11/14* (2013.01); *B60L 15/007* (2013.01); *H02P 5/74* (2013.01); *H02P 6/001* (2013.01); *H02P 29/50* (2016.02); *B60L 2210/30* (2013.01); *B60L 2210/40* (2013.01); *B60L 2240/12* (2013.01); *B60L 2240/421* (2013.01); *B60L 2240/526* (2013.01)

(58) Field of Classification Search
CPC .......... H02P 27/08; H02P 5/74; B60L 11/123; B60L 11/14; B60L 2210/13
USPC ...... 318/400.04, 400.06, 801, 599, 606, 607, 318/504, 140, 503, 723, 78, 807; 363/15, 363/19
See application file for complete search history.

(56) References Cited

U.S. PATENT DOCUMENTS

| | | | |
|---|---|---|---|
| 4,047,083 A | * | 9/1977 | Plunkett ................ H02M 7/527 318/807 |
| 5,892,468 A | * | 4/1999 | Wilson ................... H03H 17/06 341/143 |

(Continued)

FOREIGN PATENT DOCUMENTS

JP            5067325 B2     11/2012

*Primary Examiner* — Rita Leykin
(74) *Attorney, Agent, or Firm* — Oliff PLC

(57) ABSTRACT

In an apparatus, a determiner determines whether a two-MG frequency ratio of a first electrical frequency of a first MG to a second electrical frequency of a second MG is within a specific frequency-ratio range. The specific frequency-ratio range includes 1/6n where n is an integer excluding zero. An update-cycle controller controls an update cycle of a command voltage according to the determined result such that the update cycle during a specific drive of the first MG is longer than the update cycle during a usual drive of the first MG while a cycle of a carrier signal is maintained during both the usual and specific drives. The specific drive represents drive of the first MG while the two-MG frequency ratio is within the specific frequency-ratio range. The usual drive represents drive of the first MG while the two-MG frequency ratio is out of the specific frequency-ratio range.

6 Claims, 14 Drawing Sheets

(51) Int. Cl.
   *B60L 11/14*   (2006.01)
   *B60L 15/00*   (2006.01)

(56) References Cited

U.S. PATENT DOCUMENTS

| | | | | |
|---|---|---|---|---|
| 7,586,278 B2* | 9/2009 | Egami | ................... | B60K 6/445 |
| | | | | 318/139 |
| 7,609,023 B2* | 10/2009 | Egami | ................... | B60K 6/445 |
| | | | | 318/140 |
| 7,652,443 B2* | 1/2010 | Schulz | ................... | B60L 15/08 |
| | | | | 318/432 |
| 8,143,959 B2* | 3/2012 | Yaginuma | ........ | G01R 31/31709 |
| | | | | 331/78 |
| 8,165,737 B2* | 4/2012 | Schulz | ................... | B60K 6/445 |
| | | | | 318/432 |
| 8,497,646 B2* | 7/2013 | Yamada | .............. | H02P 21/0003 |
| | | | | 318/400.09 |
| 8,558,500 B2* | 10/2013 | Yamakawa | ............. | B60L 11/08 |
| | | | | 318/805 |
| 8,952,637 B2* | 2/2015 | Suzuki | ................... | H02P 25/22 |
| | | | | 318/400.01 |
| 9,077,269 B2* | 7/2015 | Nakamura | | |
| 9,166,511 B2* | 10/2015 | Morii | ................... | H02P 21/0085 |
| 9,290,107 B2* | 3/2016 | Shi | ............................. | B60L 1/00 |

\* cited by examiner

APPARATUS FOR CONTROLLING FIRST AND SECOND ROTARY ELECTRIC MACHINES

CROSS REFERENCE TO RELATED APPLICATIONS

This application is based on and claims the benefit of priority from Japanese Patent Application 2014-196450 filed on Sep. 26, 2014, the disclosure of which is incorporated in its entirety herein by reference.

TECHNICAL FIELD

The present disclosure relates to apparatuses for controlling electrical driving of a first rotary electric machine and a second rotary electric machine.

BACKGROUND

There are known apparatuses for controlling first and second inverters according to a common system voltage input to the first and second inverters to thereby control electrical driving of each of first and second alternating-current (AC) motors as an example of rotary electric machines. One of these control apparatuses is disclosed as a rotary electric-machine control system in Japanese Patent Publication No. 5067325, which will be referred to as a typical patent document.

The rotary electric-machine control system, which will be referred to simply as a control system, disclosed in the typical patent document determines whether the following first and second conditions are satisfied:

(1) The first condition is that the first AC motor electrically connected to the first inverter is operating in a known rectangular control mode, i.e. a known single-pulse control mode, based on torque-feedback control, and the second AC motor electrically connected to the second inverter is operating in a known pulse-width, modulation (PWM) control mode based on current-feedback control (2) The second condition is that the electrical-angle period of the second AC motor is six times greater than the electrical-angle period of the first AC motor.

In other words, the second condition represents that the electrical-angle frequency of the second AC motor is one-sixth the electrical-angle frequency of the first AC motor.

That is, the ratio of the electrical-angle period of the second AC motor operating in the PWM control mode to the electrical-angle period of the first AC motor operating in the rectangular control mode becomes 6:1.

Skilled persons in the art know that the PWM control of the second AC motor results in the sixth-order torque ripple being generated based on the sixth-order harmonic components of the electrical-angle frequency of the second AC motor.

The ratio of the period of the sixth-order harmonic components of the electrical-angle frequency of the second AC motor to the period of electrical-angle frequency of the second AC motor becomes 1:6. This results in the period of the sixth-order harmonic components of the electrical-angle frequency of the second AC motor substantially synchronizing with the electrical-angle period of the first AC motor. The sixth-order torque ripple based on the sixth-order harmonic components therefore synchronizes with the electrical-angle period of the first AC motor.

That is, establishment of both the first and second conditions causes the sixth-order torque ripple based on the sixth-order harmonic components to oscillate the common system voltage input to the first AC motor in synchronization with the sixth-order torque ripple. The oscillating common system voltage input to the first AC motor causes a rectangular AC voltage, i.e. a single pulse voltage, for driving the first AC motor to also oscillate in synchronization with the common system voltage. This causes the waveform of the rectangular AC voltage to offset from its original waveform, reducing the controllability of the first AC motor operating in the rectangular control mode.

To address the controllability reduction of the first AC motor, the control system is configured to reduce one of a feedback control gain and the frequency of a carrier signal, which are required to control the second AC motor operating in the PWM control mode, upon establishment of both the first and second conditions. This configuration causes the sinusoidal waveform of the sixth-order harmonic components of the electrical-angle frequency of the second AC motor to be disturbed, thus reducing adverse effects, which are based on the sixth-order harmonic components of the electrical-angle frequency of the second AC motor, on the controllability of the first AC motor.

SUMMARY

Reducing the feedback control gain or the carrier frequency while the second AC motor is operating in the PWM control mode may reduce adverse effects, which are based on the sixth-order harmonic components of the electrical-angle frequency of the second AC motor, on the controllability of the first AC motor. In particular, reducing the carrier frequency while the second AC motor is operating in the PWM control mode may reduce the number of repetitions of one waveform cycle of the carrier signal per one electrical-angular period of the second AC motor operating in the PWM control mode. This may reduce the controllability of the second. AC motor operating in the PWM control mode.

In view of the circumstances set forth above, one aspect of the present disclosure seeks to provide apparatuses for controlling a first rotary electric machine and a second rotary electric machine, each of which is capable of addressing the problem set forth above.

Specifically, a specific aspect of the present disclosure aims to provide such control apparatuses, each of which is capable of preventing the reduction in controllability of both the first and second rotary electric machines upon establishment of the first and second conditions.

According to an exemplary aspect of the present disclosure, there is provided an apparatus for controlling at least first and second rotary electric machines. The apparatus includes a PWM control unit configured to cyclically update a command voltage output to a first inverter to cause the first inverter to convert a common system voltage input thereto into a first AC voltage supplied to the first rotary electric machine according to a comparison between the command voltage and a cyclic carrier signal, thus driving the first rotary electric machine to operate in a. PWM control mode based on current feedback. The apparatus includes a rectangular control unit configured to cause a second inverter to convert the common system, voltage input thereto into a second AC voltage supplied to the second rotary electric machine, thus driving the second rotary electric machine to operate in a rectangular control mode based on torque feedback. The apparatus includes a determiner configured to determine whether a ratio of a first electrical frequency of the first rotary electric machine to a second electrical frequency of the second rotary electric machine is within a predetermined specific frequency-ratio range. The specific frequency-ratio range includes 1/6n where n is an integer excluding zero. The apparatus includes an update-cycle controller configured to control an update cycle, i.e. an update period, of the command voltage output to the first inverter according to a result of the determination by the determiner such that the update cycle during a specific drive of the first rotary electric machine is longer than the update cycle during a usual drive of the first rotary electric machine while a cycle, i.e. a period, of the carrier signal is maintained during both the usual drive and the specific drive of the first rotary electric machine. The specific drive of the first rotary electric machine represents drive of the first rotary electric machine while the ratio of the first electrical frequency to the second electrical frequency is within the specific frequency-ratio range. The usual drive of the first rotary electric machine represents drive of the first rotary electric machine while the ratio of the first electrical frequency to the second electrical frequency is out of the specific frequency-ratio range.

The apparatus according to the exemplary aspect results in the update cycle during the specific drive of the first rotary electric machine being longer than the update cycle during the usual drive of the first rotary electric machine while the cycle of the carrier signal is maintained during both the usual drive and the specific drive of the first rotary electric machine. This enables reduction of the responsivity of the first rotary electric machine to the PWM control, thus deforming the sinusoidal waveform of the sixth-order harmonic components of an electrical-angle frequency of the first rotary electric machine, which are synchronized with the system voltage. This reduces deterioration of the controllability of the second rotary electric machine operating in the regenerative control mode due to the oscillations of the system voltage.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes embodiments of the present disclosure with reference to the accompanying drawings.

First, the following describes an example of the common structure of apparatuses for controlling at least first and second motor-generators (MGs) 3 and 4 according to the respective embodiments of the present disclosure with reference to FIGS. 1 to 5.

Figure 1:
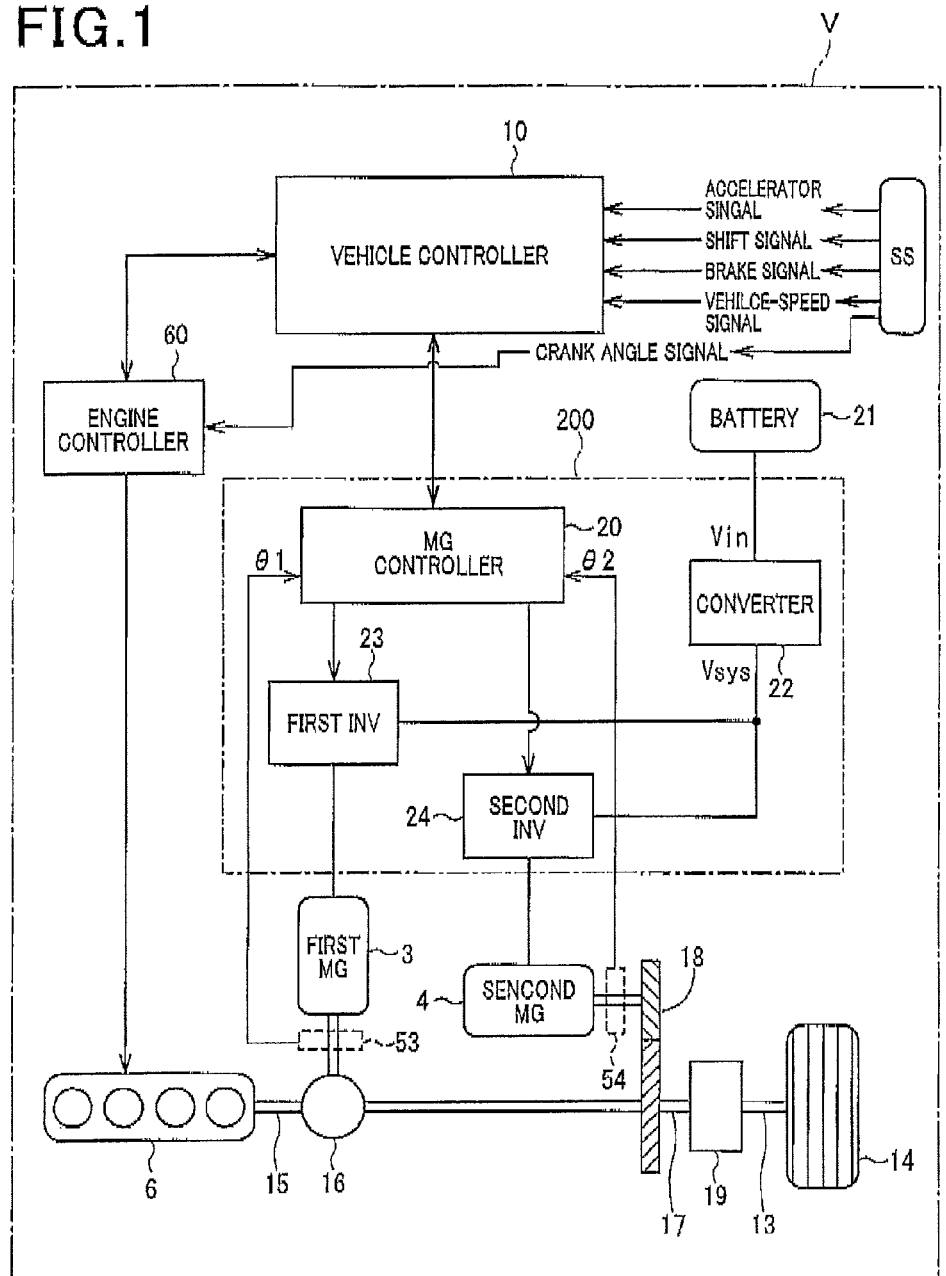
FIG. 1 is a configuration diagram schematically illustrating an example of a vehicle drive system in which an apparatus for controlling at least a first motor-generator (MG) and a second MG according to each of first to third embodiments of the present disclosure is installed.

FIG. 1 schematically illustrates a drive system installed in a vehicle, typically a hybrid vehicle V. An overall embodiment including the respective embodiments embodies an apparatus for controlling at least first and second MGs 3 and 4 as an MG controller 20 installed in the drive system. The first and second MGs 3 and 4 are an example of rotary electric machines. The MG controller 20 of the overall embodiment is applied for a power control unit 200 installed in the drive system for controlling power supplied to and/or supplied from each of the first and second motor-generators 3 and 4.

The hybrid vehicle V of the overall embodiment serves as a known series-parallel hybrid vehicle. The drive system includes, as its power sources, an internal combustion engine, referred to as an engine 6

Each of the first and second MGs 3 and 4 is a permanent magnet synchronous three-phase AC motor-generator as an example of multiphase rotary electric machines, and is connected to a corresponding one of the first and second inverters 23 and 24. Each of the first and second MGs 3 and 4 operates in a power running mode to generate torque based on power supplied from a battery 21, and operates in a regenerative mode to generate electrical power, and charge the generated electrical power to the battery 21.

Each of the first and second MGs 3 and 4 is provided with a rotor and a stator (not shown). The rotor is provided with at least one pair of permanent magnets.

The rotor has a direct axis (d-axis) in line with a direction of magnetic flux created by an N pole of the at least one pair of permanent magnets. The rotor also has a quadrature axis (q-axis) with a phase being $\pi/2$-radian electrical angle leading with, respect to a corresponding d-axis during rotation of the rotor. In other words, the q-axis is electromagnetically perpendicular to the d-axis. The d and q axes constitute a d-q coordinate system, i.e. a two-phase rotating coordinate system, defined relative to the rotor.

The stator includes a stator core such that the rotor is rotatably arranged with respect to the stator core. The stator also includes a set of three-phase windings, i.e. armature windings, wound in the stator core.

The three-phase, i.e. U-, V-, and W-phase, stator windings are wound in the stator core such that the V-, and W-phase windings are shifted by an electrical angle of, for example, $2\pi/3$ radian in phase from each other.

For example, the three-phase armature windings, i.e. U-, V-, and W-phase windings, each have one end connected to a common junction, i.e. a neutral point, and the other end to a separate terminal in, for example, a star-configuration.

The engine 6, which is, for example, a four-cylinder gasoline engine, is coupled to a power split mechanism 16 via its crankshaft 15. The power split mechanism 16 splits output power, i.e. output torque, of the engine 6 input thereto via the crankshaft 15 into first power and second power. The power split mechanism 16 is coupled to a gear mechanism 18 via a shaft SH, and the gear mechanism 18 is coupled to a differential gear mechanism 19 via a driveshaft, i.e. a propeller shaft 17. The differential gear mechanism 19 is coupled to driving wheels 14 of the vehicle V via respective driving axles 13.

The first power split by the power split/integration mechanism 16 is transferred to the gear mechanism 18 via the shaft SH. The gear mechanism 18 controls the magnitude of the first power, so that the first power, whose magnitude is controlled based on, for example, a selectable gear ratio of the gear mechanism 18, is transferred to the differential gear mechanism 19 via the propeller shaft 17. The differential gear mechanism 19 transfers the first power transferred from the gear mechanism 18 to the driving axles 18, thus rotatably driving the diving wheels 14 via the driving axles 13.

The second power split by the power split mechanism 16 is transferred to the first MG 3, so that the first MG 3 is driven based on the second power to serve as a generator for generating electrical power.

The gear mechanism 18 is also coupled to the second MG 4. Output power, i.e. torque, generated by the second MG 4 operating in the power running mode is transferred to the gear mechanism 18, so that the magnitude of the output power from the second MG 4 is controlled based on, for example, a selectable gear ratio of the gear mechanism 18. Then, the output power, whose magnitude is controlled by the gear mechanism 18, is transferred to the driving axles 13 via the propeller shaft 17, so that the driving wheels 14 are rotatably driven.

The vehicle V includes, in addition to the power control unit 200, a vehicle controller 10 and an engine controller 60. The vehicle controller 10 is communicably coupled to the MG controller 20 and to the engine controller 60.

The vehicle controller 10 is designed as, for example, a microcomputer circuit. Specifically, the vehicle controller 10 essentially includes, for example, a CPU, a memory, such as a ROM and/or a RAM, an I/O interface, and a bus connecting between the CPU, memory, and I/O interface. The vehicle controller 10 can include at least one special-purpose electronic circuit. Specifically, the vehicle controller 10 is configured such that the CPU performs instructions of programs stored in the memory, thus performing predetermined software tasks associated with the vehicle V. The vehicle controller 10 can also be configured such that the at least one special-purpose electronic circuit performs predetermined hardware tasks associated with the vehicle V. The vehicle controller 10 can be configured to perform both the software tasks and the hardware tasks.

Various sensors and switches SS indicative of the driving conditions of the vehicle V are installed in the vehicle V. The sensors and switches SS include, for example, an accelerator sensor, a vehicle speed sensor, a crank angle sensor, a brake switch, and a shift switch.

The accelerator sensor is operative to detect a position or stroke of a driver-operable accelerator pedal of the vehicle V, and output an accelerator signal indicative of the measured driver's operated position or stroke of the accelerator pedal to the vehicle controller 10.

The vehicle speed sensor is operative to measure the speed of the vehicle V, and operative to output, to the vehicle controller 10, a vehicle-speed signal indicative of the measured speed of the vehicle V.

The crank angle sensor is operative to output, to the engine controller 60, a crank angular signal, such as a crank pulse, each time the crankshaft 15 is rotated by a preset angle.

The brake switch is operative to, for example, detect whether a brake pedal of the vehicle V is operated, and output, to the vehicle controller 10, a brake signal when it is determined that the brake pedal is operated.

The shift switch is operative to detect a driver's selected gear ratio of the gear mechanism 18 installed in the vehicle V, and output a shift signal indicative of the driver's selected gear ratio to the vehicle controller 10.

The vehicle controller 10 receives the signals sent from the sensors and/or switches SS, and detects the driving conditions of the vehicle V based on the received signals. The vehicle controller 10 also generate a value of request torque and a value of request speed for each of the first and second MGs 3 and 4 according to the detected driving conditions of the vehicle V. Then, the vehicle controller 10 outputs the value of the request torque and the value of request speed for each of the first and second MGs 3 and 4 to the MG controller 20. The vehicle controller 10 is further configured to output, to the engine controller 60, such as an engine ECU 60, instruction signals.

The engine controller 60 is configured to (1) Receive the instruction signals and the crank angular signal (2) Obtain the actual crank angle of the crankshaft 15 relative to a reference angle, and an actual engine RPM based on the received crank angular signal (3) Control various actuators of the engine 6 according to the received instruction signals and the obtained actual crank angle and the actual engine RPM.

Figure 2:
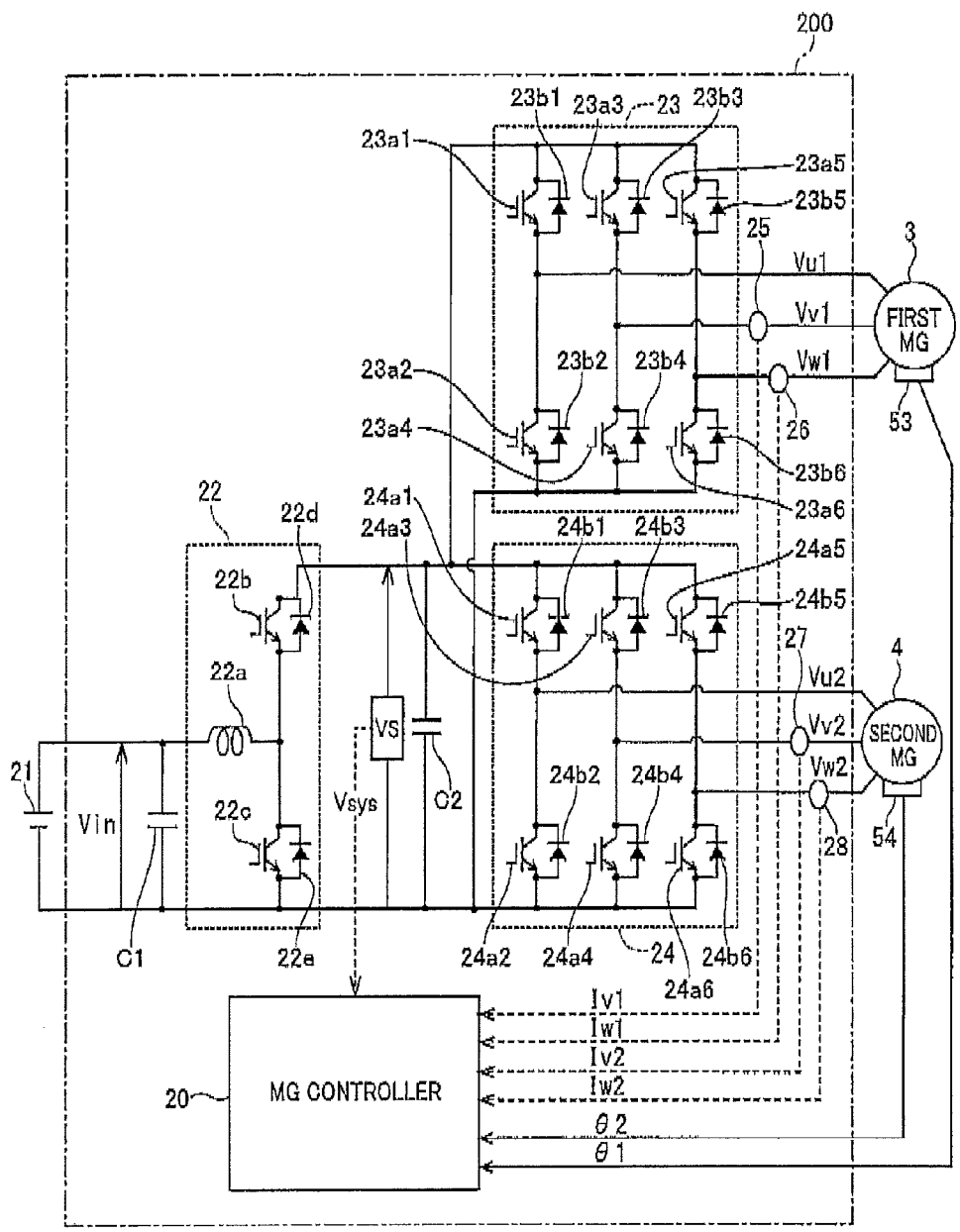
FIG. 2 is a circuit diagram schematically illustrating an example of the circuit structure of a power control unit illustrated in FIG. 1.

The power control unit 200 includes the MG controller 20, a converter 22, a first inverter (FIRST INV) 23, a second inverter (SECOND INV) 24, a first V-phase current sensor 25 (see FIG. 2), and a first W-phase current sensor 26 (see FIG. 2). The power control unit 200 also includes a second V-phase current sensor 27 (see FIG. 2), a second W-phase current sensor 28 (see FIG. 2), a voltage sensor VS, a first rotational angle sensor 53, and a second rotational angle sensor 54.

The following uses reference characters expressing electrical parameters including voltage, current, electrical angle, and so on associated with the first MC 3; each of the characters has a subscript of 1. In contract, the following uses reference characters expressing electrical parameters including voltage, current, electrical angle, and so on associated with the second MG 4; each of the characters has a subscript of 2.

Each of the first and second rotational angle sensors 53 and 54 includes, for example, a resolver. The first rotational angle sensor 53 is disposed to be adjacent to the rotor of the first MG 3, and is connected to the MG controller 20. The first rotational angle sensor 53 is configured to measure, i.e. monitor, a rotational electrical angle $\theta 1$ of the rotor of the first MG 3, and output, to the MG controller 20, the measured rotational electrical angle $\theta 1$ of the rotor of the first MG 3. Similarly, the second rotational angle sensor 54 is disposed to be adjacent to the rotor of the second MG 4, and is connected to the MG controller 20. The second MG 4 is configured to measure, i.e. monitor, a rotational electrical angle $\theta 2$ of the rotor of the second MG 4, and output, to the MG controller 20, the measured rotational electrical angle $\theta 2$ of the rotor of the second MG 4.

A chargeable direct-current (DC) battery, such as a nickel-hydrogen battery or a lithium-ion battery, can be used as the battery 21.

As illustrated in FIG. 2, the converter 22 includes an inductor 22a, an upper-arm switching element 22b, a lower-arm switching element 22c, a first rectifying diode 22d, and a second rectifying diode 22e. A first end of the inductor 22a is connected to a positive terminal of the battery 21. The upper- and lower-arm switching elements 22b and 22e are for example semiconductor switching elements, such as IGBTs. The overall embodiment uses an IGBT for each of the upper- and lower-switching elements 22b and 22c. The emitter of the upper-switching element 22b is connected to the collector of the lower-arm switching element 22c. The connecting point between the upper- and lower-arm switching elements 22b and 22c is connected to a second end of the inductor 22a opposite to the first end. The collector of the upper arm switching element 22b is connected to positive terminals of the first inverter 23 and the second inverter 24. The emitter of the lower-arm switching element 22c is connected to negative terminals of the first inverter 23 and the second inverter 24. The gates of the upper and lower-arm switching elements 22b and 22c are connected to the MG controller 20.

The anode of the first rectifying diode 22d is connected to the emitter of the upper-arm switching element 22b, and the cathode of the first rectifying diode 22d is connected to the collector of the upper-arm switching element 22d. The anode of the second rectifying device 22e is connected to the emitter of the lower-arm switching element 22c, and the cathode of the second rectifying diode 22e is connected to the collector of the lower-arm switching element 22c.

The power control unit 200 of the overall embodiment includes a capacitor C1 disposed between the battery 21 and the inductor 22a and connected in parallel to the battery 21. The power control unit 200 also includes a capacitor C2 disposed between the converter 22 and each of the first and second inverters 23 and 24 and connected in parallel to the converter 22. A first end of the capacitor C1 is connected to the positive terminal of the battery 21, and a second end, opposite to the first end, of the capacitor C1 is connected to the negative terminal of the battery 21. A first end of the capacitor C2 is connected to the collector of the upper-arm switching element 22b, and a second end, opposite to the first end, of the capacitor C2 is connected to the emitter of the lower-arm switching element 22c. The capacitor C1 is, for example, capable of suppressing an input surge voltage from the battery 21 to the converter 22. The capacitor C2 is, for example, capable of stabilizing an output voltage from the converter 22.

The converter 22 is capable of boosting a voltage Vin input thereto from the battery 21 based on switching operations of the upper- and lower-arm switching elements 22b and 22c under control of the MG controller 20. The converter 22 outputs the boosted input voltage Vin as a system voltage Vsys to the positive terminal of each of the first and second inverters 23 and 24.

The converter 22 is also capable of decreasing a voltage output from each of the first and second inverters 23 and 24, and outputting the decreased voltage to the battery 21 via the capacitor C1. That is, the converter 21 has a function of increasing and reducing an input voltage as necessary.

The first inverter 23 includes switching elements 23a1 to 23a6 and rectifying diodes 23b1 to 23b6. The switching elements 23a1 to 23a6 are for example semiconductor switching elements, such as IGBTs. The overall embodiment uses an IGBT as each of the switching elements 23a1 to 23a6.

The emitter of the switching element 23a1 is connected to the collector of the switching element 23a2 to constitute a pair of high- and low-side, i.e. upper- and lower-arm, switching elements. The emitter of the switching element 23a3 is connected to the collector of the switching element 23a4 to constitute a pair of high- and low-side switching elements. The emitter of the switching element 23a5 is connected to the collector of the switching element 23a6 to constitute a pair of high- and low-side switching elements. The collectors of the switching elements 23a1, 23a3, and 23a5 are connected to the positive terminal of the battery 21 via the upper switching element 22b and inductor 22a of the converter 22. The emitters of the switching elements 23a2, 23a4, and 23a6 are connected to the negative terminal of the battery 21, i.e., the emitter of the lower-arm switching element 22e of the converter 22. The gates of the switching elements 23a1 to 23a6 are connected to the MG controller 20.

The connection point between the high- and low-side switching elements 23a1 and 23a2 is connected to the U-phase winding of the first MG 3. The connection point between the high- and low-side switching elements 23a3 and 23a4 is connected to the V-phase winding of the first MG 3. The connection point between the high- and low-side switching elements 23a5 and 23a6 is connected to the W-phase winding of the first MG 3.

Each of the rectifying diodes 23b1 to 23b6 is connected in antiparallel to a corresponding one of the switching elements 23a1 to 23a6.

The second inverter 24 includes switching elements 24a1 to 24a6 and rectifying diodes 24b1 to 24b6. The switching elements 24a1 to 24a6 are for example semiconductor switching elements, such as IGETs. The overall embodiment uses an IGET as each of the switching elements 24a1 to 24a6.

The emitter of the switching element 24a1 is connected to the collector of the switching element 24a2 to constitute a pair of high- and low-side, i.e. upper- and lower-arm, switching elements. The emitter of the switching element 24a3 is connected to the collector of the switching element 24a4 to constitute a pair of high- and low-side switching elements. The emitter of the switching element 24a5 is connected to the collector of the switching element 24a6 to constitute a pair of high- and low-side switching elements. The collectors of the switching elements 24a1, 24a3, and 24a5 are connected to the positive terminal of the battery 21 via the upper switching element 22b and inductor 22a of the converter 22. The emitters of the switching elements 24a2, 24a4, and 24a6 are connected to the negative terminal of the battery 21, i.e., the emitter of the lower-arm switching element 22e of the converter 22. The gates of the switching elements 24a1 to 24a6 are connected to the MG controller 20.

The connection point between the high- and low-side switching elements 24a1 and 24a2 is connected to the U-phase winding of the second MG 4. The connection point between the high- and low-side switching elements 24a3 and 24a4 is connected to the V-phase winding of the second MG 4. The connection point between the high- and low-side switching elements 24a5 and 24a6 is connected to the W-phase winding of the second MG 4.

Each of the rectifying diodes 24b1 to 24b6 is connected in antiparallel to a corresponding one of the switching elements 24a1 to 24a6.

Each of the first and second inverters 23 and 24 converts, based on switching operations of the corresponding switching elements under control of the MG controller 20, DC power, such as the system voltage Vsys commonly input to the corresponding inverter, into three-phase AC power, such as a three-phase AC voltage while the corresponding MG is operating in the power running mode. Then, each of the first and second inverters 23 and 24 supplies the three-phase AC power to the corresponding MG.

Additionally, each of the first and second inverters 23 and 24 converts, based on switching operations of the corresponding switching elements under control of the MG controller 20, three-phase AC power, such as a three-phase AC voltage, generated by each of the first and second MGs 3 and 4 into DC power, such as a DC voltage while the corresponding MG is operating in the regenerative mode. Then, each of the first and second inverters 23 and 24 charges the battery 21 based on the DC power.

Note that rectangular control for an MG in the rectangular control mode via a corresponding inverter is configured such that the ratio of an on duration to an off duration of each drive pulse, i.e. pulse pattern, for each of the switching elements of the corresponding inverter is set to 1:1 every period of the electrical rotational angle of the rotor of the MG.

The MG controller 20 is designed as, for example, a microcomputer circuit. Specifically, the MG controller 20 essentially includes, for example, a CPU, a memory, such as a ROM and/or a RAM, an I/O interface, and a bus connecting between the CPU, memory, and I/O interface.

Figure 3:
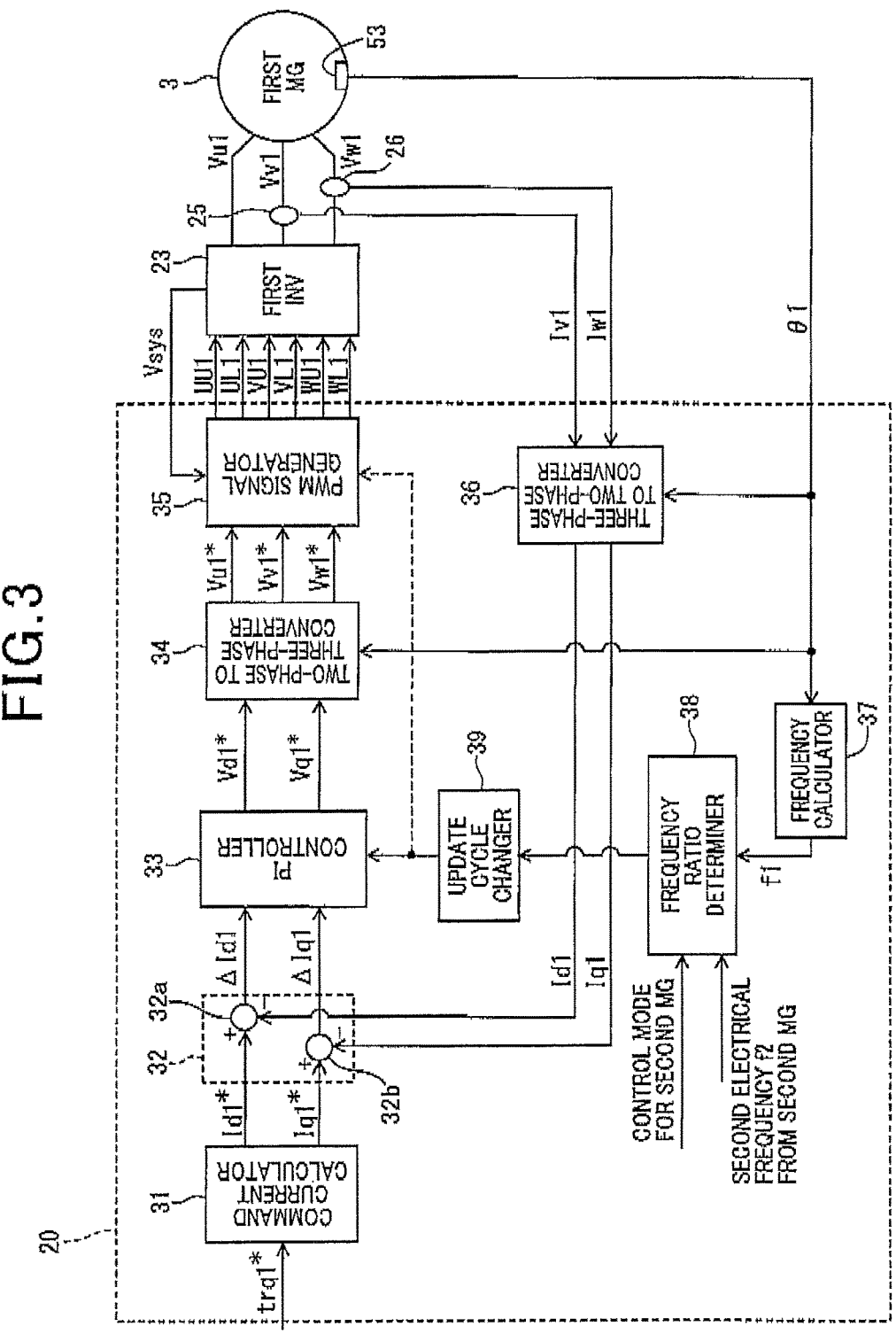
FIG. 3 is a schematic functional block diagram of a MG controller of the power control unit when the MG controller serves to cause the first MG to operate in a PWM control mode.
Figure 4:
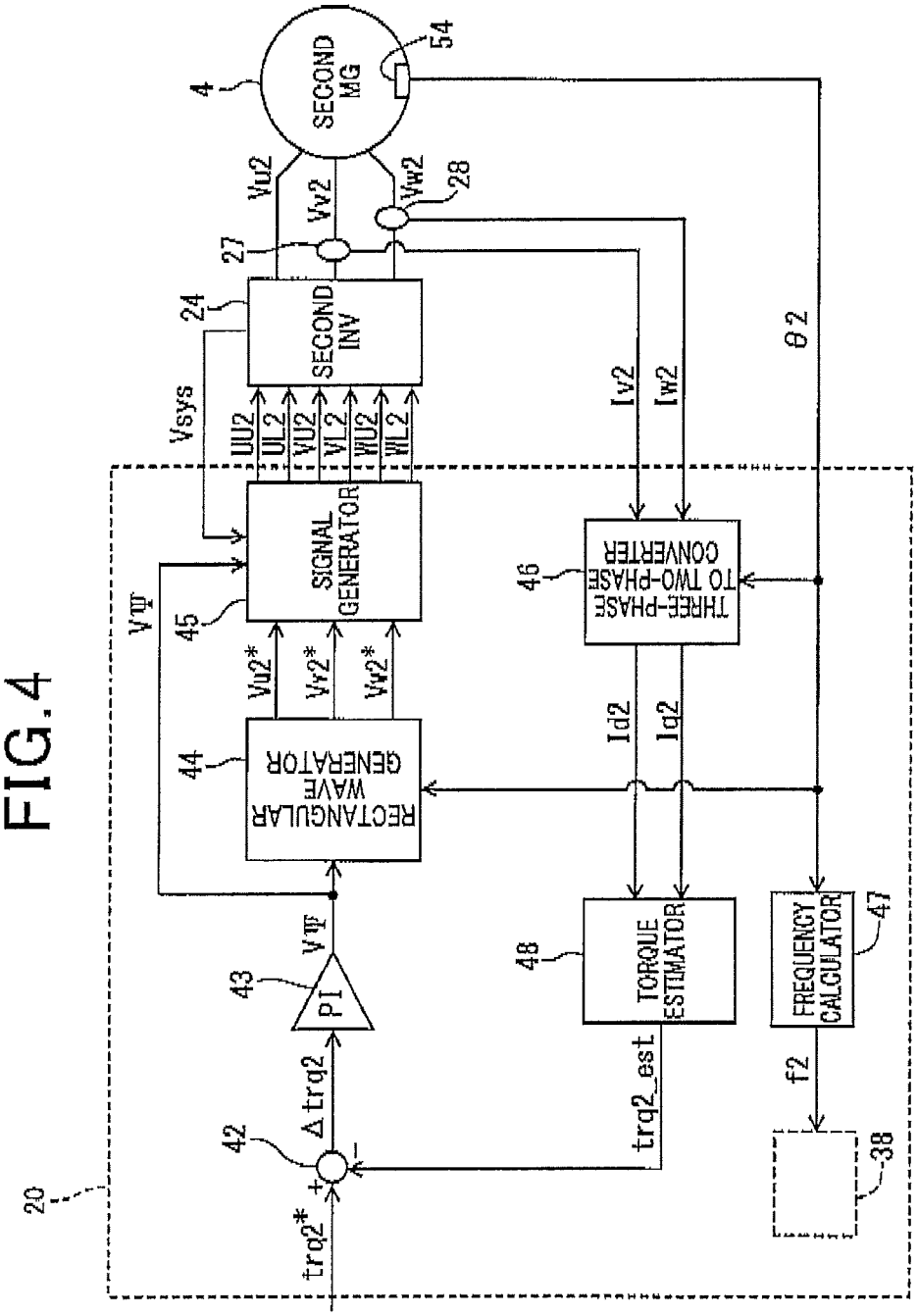
FIG. 4 is a schematic functional block diagram of a MG controller of the power control unit when the MG controller serves to cause the second MG to operate in a rectangular control mode.

The following describes an example of the functional structure of the MG controller 20, which controls the first and second inverters 23 and 24 to thereby cause each of the first and second MGs 3 and 4 to operate in one of the PWM control mode and the rectangular control mode with reference to FIGS. 3 and 4. In other words, the MG controller 20 determines one of the PWM control mode and the rectangular control mode as the control mode for each of the first MG 3 and the second MG 4.

Specifically, the MG controller 20 receives the value of the request torque and the value of request speed for each of the first and second MGs 3 and 4. For example, the MG controller 20 controls the first inverter 23 to cause the first MG 3 to operate in the PWM control mode when the value of the request torque for the first MG 3 is lower than a predetermined threshold value of torque and the value of request speed for the first MG 3 is lower than a predetermined speed. For example, the MG controller 20 also controls the first inverter 23 to cause the first MG 3 to operate in the rectangular control mode when the value of the request torque is equal to or higher than the predetermined threshold value of torque and the value of request speed for the first MG 3 is equal to or higher than the predetermined speed.

Similarly, for example, the MG controller 20 controls the second inverter 24 to cause the second MG 4 to operate in the PWM, control mode when the value of the request torque for the second MG 4 is lower than a predetermined threshold value of torque and the value of request speed for the second MG 4 is lower than a predetermined speed. For example, the MG controller 20 also controls the second inverter 23 to cause the second MG 4 to operate in the rectangular control mode when the value of the request torque is equal to or higher than the predetermined threshold value of torque and the value of request speed for the second MG 4 is equal to or higher than the predetermined speed.

In particular, the MG controller 20 according to the overall embodiment is configured to control the first and second inverters 23 and 24 to cause one of the first and second MGs 3 and 4 to operate in the PWM control mode, and the other to operate in the rectangular control mode. The following describes that the MG controller 20 controls the first inverter 23 to cause the first MG 3 to operate in the PWM control mode, and controls the second inverter 24 to cause the second MG 4 to operate in the rectangular control mode as a typical control example for facilitating the understanding of the operations of the MG controller 20. That is, the typical control example represents a situation where the first MG 3 operating in the PWM control mode is rotating at a value relatively lower than a value at which the second MG 4 operating in the rectangular control mode is rotating.

FIG. 3 illustrates an example of the functional structure of the MG controller 20, which controls the first MG 3 to thereby cause the first MG 3 to operate in the PWM control mode. FIG. 4 illustrates an example of the functional structure of the MG controller 20, which controls the second MG 4 to thereby cause the second MG 4 to operate in the rectangular control mode.

Referring to FIG. 3, the MG controller 20, which causes the first MG 3 to operate in the PWM control mode, functionally includes a command current calculator 31, a command current subtractor 32, a PI controller 33, a two-phase to three-phase converter 34, and a PWM signal generator 35. The MG controller 20, which causes the first MG 3 to operate in the PWM control mode, also functionally includes a three-phase to two-phase converter 36, a frequency calculator 37, a frequency ratio determiner 38, and an update cycle changer 39.

The modules included in the MG controller 20 illustrated in FIG. 3 cooperatively operate to carry out operation in the PWM control mode. The modules can be implemented as hardware modules, software modules, and/or hardware-software hybrid modules.

The command current calculator 31 is operative to calculate a command d-axis current id1* and a command q-axis current iq1* in the d-q coordinate system of the rotor of the first MG 3 according to the value of request torque trq1* for the first MG 3 supplied from the vehicle controller 10. The command d-axis current id1* and command q-axis current iq1* are required to obtain torque of the first MG 3 matching with the value of the request torque trq1*.

For example, the command current calculator 31 has a map in data-table format, in mathematical expression format, and/or program format. The map includes information indicative of a relationship between values of each of the command d-axis current Id1* and the command q-axis current Iq1*, and values of the request torque trq1*. Specifically, the command current calculator 31 refers to the map, and extracts a value of each of the command d-axis current Id1* and the command q-axis current Iq1* corresponding to the input value of the request torque trq1*. Note that a d-axis current and a q-axis current will be simply described as d-q axis currents hereinafter.

To the three-phase to two-phase converter 36, values of the V- and W-phase currents Iv1 and Iw1 measured by the respective V- and W-phase current sensors 25 and 26, and the rotational electrical angle θ1 of the rotor of the first MG 3 measured by the first rotational angle sensor 53 are input.

The three-phase to two-phase converter 36 calculates a U-phase current Iu1 based on to the V- and W-phase currents Iv1 and Iw1 in accordance with Kirchhoff's law. Then, the three-phase to two-phase converter 36 converts the three-phase currents Iu1, Iv1 and Iw1 into d- and q-axis current values Id1 and Iq1 using the rotational electrical angle θ1 and, for example, a known conversion equation or map.

The overall embodiment measures the V- and W-phase currents Iv1 and Iw1, and calculates the remaining U-phase current Iu1, but the other embodiments con measure any two-phase currents, or measure all three-phase currents Iu1, Iv1 and Iw1. Each of the embodiments can use a single current sensor provided for one phase winding, and estimate, based on a value of a corresponding one-phase current measured by the single current sensor, values of the remaining two-phase currents.

The command current subtractor 32 includes a first subtractor 32a and a second subtractor 32b. The first subtractor 32a is operative to subtract the d-axis current value Id1 fed back from the three-phase to two-phase converter 36 from the command d-axis current Iq1* to thereby calculate a d-axis deviation ΔId1. The second subtractor 32b is operative to subtract the q-axis current value Iq1 fed back from the three-phase to two-phase converter 36 from the command q-axis current Iq1* to thereby calculate a q-axis deviation ΔIq1.

The PI controller 33 is operative to perform a proportional-integral (PI) feedback operation using the d-axis deviation Δid1 as input data, and a proportional gain term and an integral gain term of a PI feedback control algorithm (PI algorithm). The PI feedback operation calculates a command d-axis voltage Vd1* such that the d-axis deviation ΔId1 converges to zero, thus causing the d-axis current value Id1 to follow the command d-axis current Id1*. The PI controller 33 is also operative to perform a PI feedback operation using the q-axis deviation ΔIq1 as input data, and a proportional gain term and an integral gain term of a PI feedback control algorithm (PI algorithm). The PI feedback operation calculates a command q-axis voltage Vq1* such that the q-axis deviation ΔIq1 converges to zero, thus causing the q-axis current value 41 to follow the command q-axis current Iq1*.

To the two-phase to three-phase converter 34, the command d-axis voltage Vd1* and command q-axis voltage Vq1* calculated by the PI controller 33, and the rotational electrical angle θ1 of the first MG 3 are input.

Then, the two-phase to three-phase converter 34 converts the command d-axis voltage Vd1* and command q-axis voltage Vq1* into three-phase command voltages Vu1*, Vv1*, and Vw1* using the rotational electrical angle θ1 and, for example, map data or equation data. The map data or equation data represents correlations between values of the three-phase command voltages Vu1*, Vv1*, and Vw1*, values of the command d-axis voltage Vd1* and command q-axis voltage Vq1*, and values of the rotational electrical angle θ1.

The PWM-signal generator 35 is operative to calculate, based on the three-phase command voltages Vu1*, Vv1*, and Vw1* and the system voltage Vsys, PWM drive signals UU1, UL1, VU1, VL1, WU1, and WL1 for the respective switching elements 23a1, 23a2, 23a3, 23a4, 23a5, and 23a6 of the first inverter 23. Each of the PWM drive signals UU1, UL1, VU1, VL1, WU1, and WL1 is a pulse signal with a controllable duty, i.e. a controllable on-pulse width for each switching cycle. In other words, the controllable duty for each switching element is a predetermined ratio, i.e. percentage, of on duration to the total duration of each switching cycle for the switching element.

The PWM drive signals UU1, UL1, VU1, VL1, WU1, and WL1 are required for the first MG 3 to generate three-phase voltages Vu1, Vv1, and Vw1 corresponding to the respective three-phase command voltages Vu1*, Vv1*, and Vw1*.

The PWM-signal generator 35 of the overall embodiment compares in amplitude each of three-phase command voltages Vu1*, Vv1*, and Vw1* with a triangular or saw-tooth carrier signal C that oscillates with positive peaks, i.e. crests, and negative peaks, troughs. Then, the PWM-signal generator 35 generates the PWM drive signals UU1, UL1, VU1, VL1, WU1, and WL1 according to the compared results.

That is, the MG controller 20 is operative to perform on-off operations of the switching elements 23a1, 23a2, 23a3, 23a4, 23a5, and 23a6 of the first inverter 23 based on the respective PWM drive pulses UU1, UL1, VU1, VL1, WU1, and WL1, thus generating the three-phase voltages Vu1, Vv1, and Vw1 as output of the first MG 3. The three-phase voltages Vu1, Vv1, and Vw1 are applied to the first MG 3, so that the first MG 3 is driven based on the three-phase voltages Vu1, Vv1, and Vw1 to generate torque matching with the value of the request torque trq1*.

Note that the positive amplitude of one of the three-phase command voltages Vu1*, Vv1*, and Vw1* becoming equal to the amplitude of the carrier signal causes the PWM-signal generator 35 to generate the corresponding upper-arm drive signal having the duty of 100%. The duty of 100% represents that the corresponding upper-arm switching element is continuously on for a corresponding switching cycle. Thus, the three-phase command voltages Vu1*, Vv1*, and Vw1* will also be called duty command signals.

The frequency calculator 37 is operative to calculate an angular velocity ω1 based on the rate of change of the rotational electrical angle θ1, and convert the angular velocity ω1 into a first electrical frequency f1 of the first MG 3.

The frequency ratio determiner 38 is operative to obtain the electrical frequency f1 of the first MG 3 from the frequency calculator 37 and a second electrical frequency f2 of the second MG 4, which is obtained thereby in the rectangular control mode described later. The frequency ratio determiner 38 also obtains information indicative of the control mode for the second MG 4. Note that the overall embodiment establishes the control mode for the second MG 4 is the rectangular control mode, so that the information indicative of the rectangular control mode is obtained by the frequency ratio determiner 38.

Then, the frequency ratio determiner 38 is operative to calculate the ratio of the first electrical frequency f1 of the first MG 3 to the second electrical frequency f2 of the second MG 4. The frequency ratio determiner 38 is also operative to determine whether the control mode for the second MG 4 is the rectangular control mode, and the ratio of the first electrical frequency f1 to the second electrical frequency f2, which is expressed by f1/f2, is within at least one predetermined specific frequency-ratio range.

The frequency ratio determiner 38 is further operative to sends an instruction to the update cycle changer 39 to instruct the update cycle changer 39 to change a voltage-command update cycle, i.e. a voltage-command update period. The meaning of each of the terms "specific frequency-ratio range" and "voltage-command update cycle" will be described later.

Note that the MG controller 20 performs the above operations in the PWM control mode every switching cycle set forth above, so that each of the modules 31 to 38 performs the corresponding operations for every operation cycle matching with the switching cycle.

The update cycle changer 39 is operative to change the voltage-command update cycle according to the instruction sent from the frequency ratio determiner 38.

Specifically, the update cycle changer 39 controls the PI controller 33 to change the length of the operation cycle, i.e. the operation period, of the PI controller 33, or controls the PWM signal generator 35 to change the length of the operation cycle of the PWM signal generator 35, i.e., the PWM-signal output cycle thereof. The solid arrow between the blocks 33 and 39 in FIG. 3 represents that the update cycle changer 39 controls the PI controller 33, and the dashed arrow between the blocks 35 and 39 in FIG. 3 represents that the update cycle changer 39 controls the PWM signal generator 35.

Referring to FIG. 4, the MG controller 20, which causes the second MG 4 to operate in the rectangular control mode, functionally includes a torque subtractor 42, a PI controller 43, a rectangular-wave generator 44, a signal generator 45, a three-phase to two-phase converter 46, a frequency calculator 47, and a torque estimator 48.

To the three-phase to two-phase converter 46, values of the V- and W-phase currents Iv2 and Iw2 measured by the respective V- and W-phase current sensors 27 and 28, and the rotational electrical angle θ2 of the rotor of the second MG 4 measured by the second rotational angle sensor 54 are input.

The three-phase to two-phase converter 46 calculates a U-phase current Iu2 based on to the V- and W-phase currents Iv2 and Iw2 in accordance with Kirchhoff's law. Then, the three-phase to two-phase converter 46 converts the three-phase currents Iu2, Iv2 and Iw2 into d- and q-axis current values Id2 and Iq2 using the rotational electrical angle θ2 and, for example, a known conversion equation or map. Like the three-phase to two-phase converter 36, the three-phase to two-phase converter 46 can obtain the d- and q-axis current values Id2 and Iq2 using a value of a corresponding one-phase current measured by the single current sensor, values of any two-phase currents, or values of all three-phase currents.

The torque estimator 48 is operative to obtain estimated torque trq2_est based on the d-axis and q-axis current values Id2 and Iq2 input from the three-phase to two-phase converter 46.

For example, the torque estimator 48 obtains the estimated torque trq2_est using, for example, a map in datatable format, in mathematical expression format, and/or program format. The map includes a function, i.e. correlation, between values of the estimated torque trq2_est with respect to pairs of the d- and q-axis current values Id2 and Iq2. The torque estimator 48 retrieves a value of the estimated torque trq2_est corresponding to a pair of the d- and q-axis current values Id2 and Iq2 in the map. Then, the torque estimator 48 feeds back the value of the estimated torque trq2_est to the torque subtractor 42.

The torque subtractor 42 is operative to subtract the value of the torque estimated value trq2_est from the value of the request torque trq2* supplied from the vehicle controller 10 to thereby calculate a torque deviation Δtrq2 between the value of the estimated torque trq2_est and the value of the request torque trq2*.

The PI controller 43 is operative to perform a PI feedback operation using the torque deviation Δtrq2 as input data, and a proportional gain term and an integral gain term of a PI feedback control algorithm (PI algorithm). The PI feedback operation calculates a voltage phase command Vψ such that the torque deviation Δtrg2 converges to zero. This causes the value of the estimated torque trq2_est to follow the value of the request torque trq2*.

The rectangular-wave generator 44 is operative to generate, based on the voltage phase command Vψ and the electric rotational angle θ2, rectangular U-, V-, and W-phase voltage commands Vu2*, Vv2*, and Vw2*, i.e. U-, V-, and W-phase voltage command pulses Vu2*, Vv2*, and Vw2*.

The signal generator 45 is operative to generate, based on for example, the voltage phase command Vψ, the system voltage Vsys, and the three-phase voltage commands Vu2*, Vv2*, and Vw2*, drive signals, i.e. drive pulses, UU2, UL2, VU2, VL2, WU2, and WL2 for the respective switching elements 24a1, 24a2, 24a3, 24a4, 24a5, and 24a6 of the second inverter 24. The drive pulses UU2, UL2, VU2, VL2, WU2, and WL2 are required for the second MG 4 to generate three-phase voltages Vu2, Vv2, and Vw2 corresponding to the respective three-phase command voltages Vu2*, Vv2*, and Vw2*.

That is the MG controller 20 is operative to perform on-off operations of the switching elements 24a1, 24a2, 24a3, 24a4, 24a5, and 24a6 of the second inverter 24 based on the respective drive pulses UU2, UL2, VU2, VL2, WU2, and WL2, thus generating three-phase voltages Vu2, Vv2, and Vw2 as output of the second inverter 24. The three-phase voltages Vu2, Vv2, and Vw2 are applied to the second MG4, so that the second MG 4 is driven based on the three-phase voltages Vu2, Vv2, and Vw2 to generate torque matching with the value of the request torque trq2*.

The frequency calculator 47 is operative to calculate an angular velocity ω2 based on the rate of change of the rotational electrical angle θ2, and convert the angular velocity ω2 into the second electrical frequency f2 of the second MG 4 set forth above. Then, the frequency calculator 47 sends the second electrical frequency 12 to the frequency ratio determiner 38.

Figure 5:
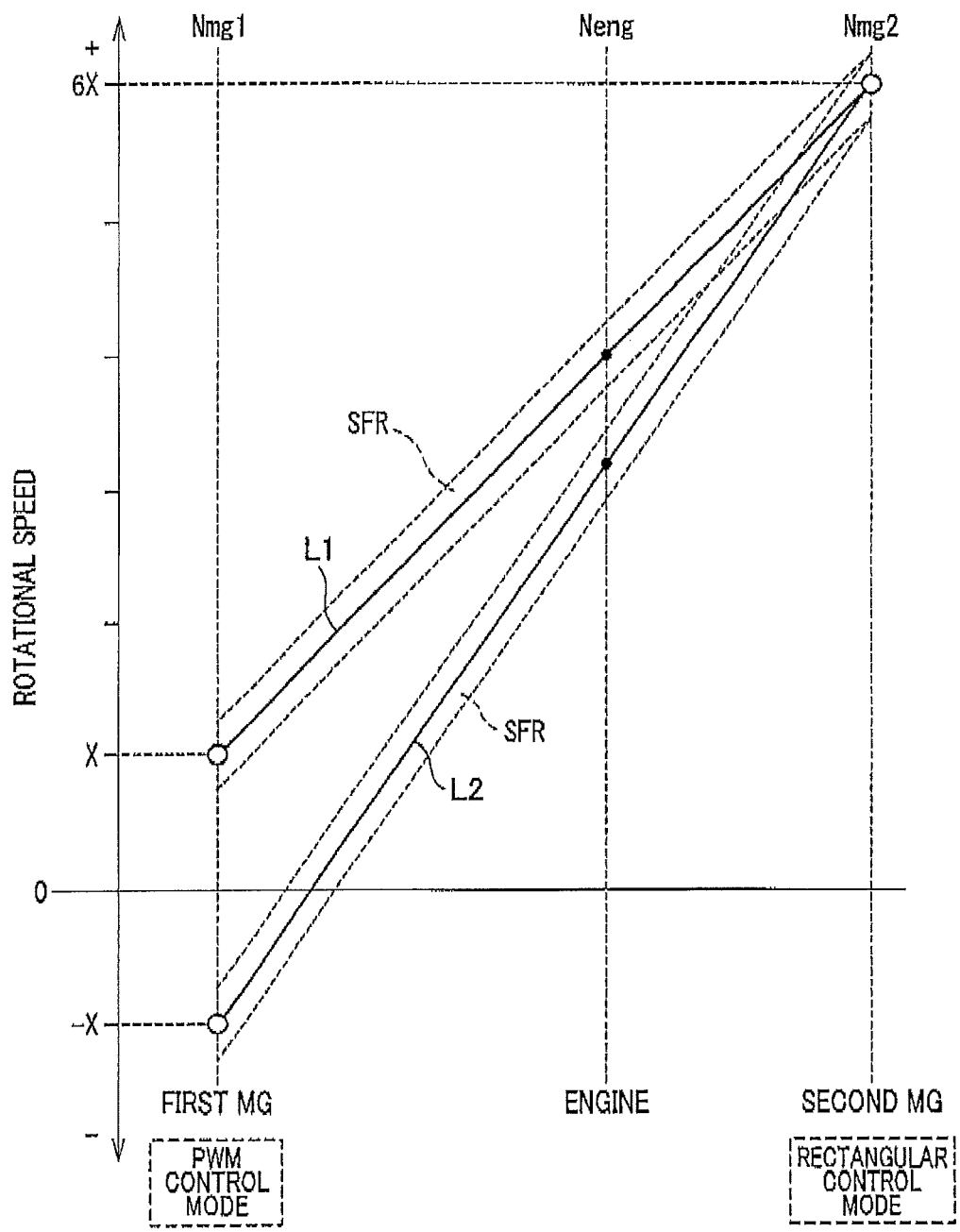
FIG. 5 is a collinear diagram schematically illustrating the relative relationships among the rotational speeds of the first MG, an internal combustion engine of the vehicle drive system, and the second MG.
Figure 9:
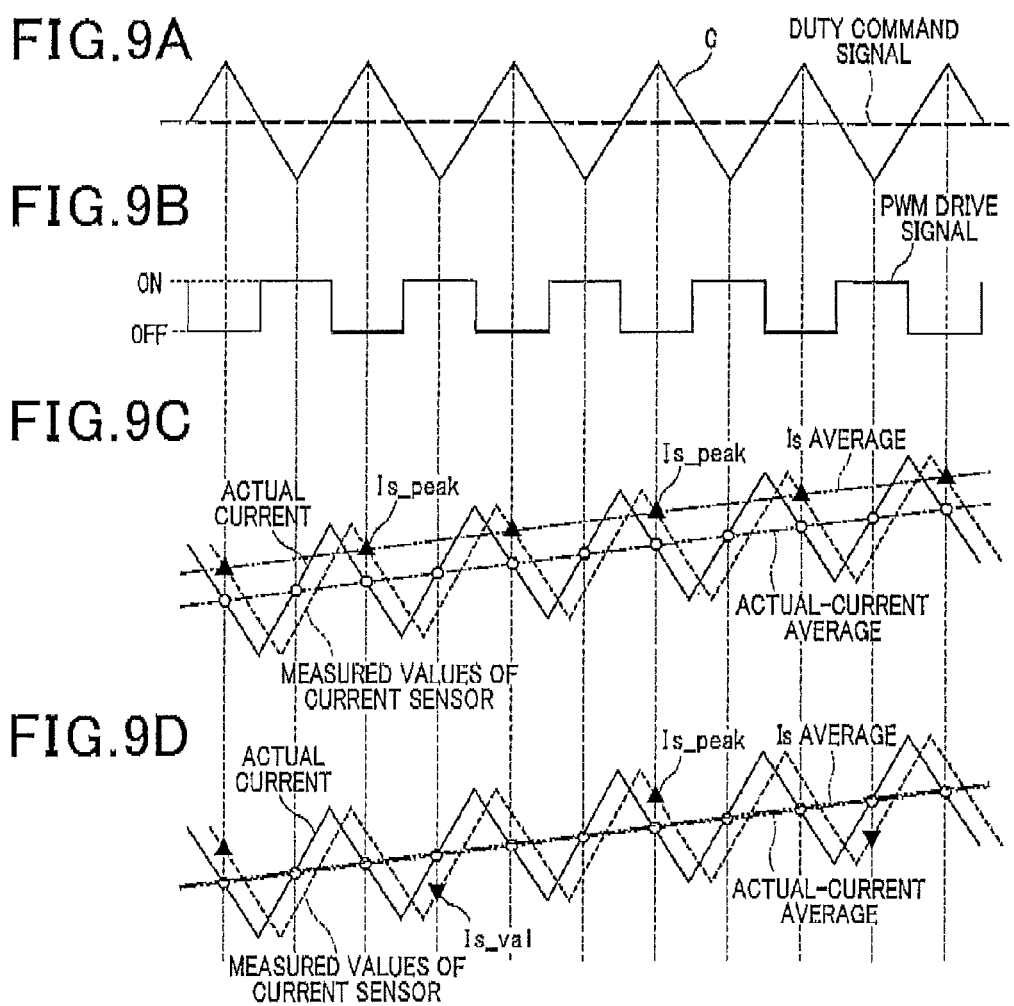
FIGS. 9A to 9D illustrate a joint timing chart schematically illustrating how the carrier signal, PWM drive signal, actual values of a V-phase current, and measured values of the V-phase current change over time.

Next, the following describes in detail a problem to be addressed by the present disclosure with reference to FIG. 5. FIG. 5 is a collinear diagram schematically illustrating the relative relationships among the rotational speeds of the first MG 3, the engine 6, and the second MG 4. In FIG. 9, reference characters Nmg1, Neng, and Nmg2 respectively represent the rotational speed of the first MG 3, the rotational speed of the engine 6, and the rotational speed of the second MG 4. The rotational speeds Nmg1, Neng, and Nmg2 of the respective first MG 3, the engine 6, and the second MG 4, which are coupled to each other via the power split mechanism 16, are plotted on a straight line in FIG. 9 assuming that the reducing ratio of the gear mechanism 18, which transfers rotation of the second MG 4 to the propeller shaft 17, is set to 1. In other words, the rotational speeds Nmg1, Neng, and Nmg2 of the respective first MG 3, the engine 6, and the second MG 4 are changed while a linear relationship thereamong is maintained.

Note that, as described above, the rotational speed Nmg1 of the first MG3 becomes to be less than the rotational speed Nmg2 of the second MG 4, and a value of the rotational speed Nmg1 of the first MG 3 is negative when the first MG 3 is operating in the regenerative mode.

Let us assume that the situation where the first MG 3 is operating in the PWM control mode and the second MG 4 is operating in the rectangular control mode is established. The overall embodiment focuses on the ratio (f1/f2) of the first electrical frequency f1 of the first MG 3 to the second electrical frequency f2 of the second MG 4 in the situation. Assuming that the number of pole pairs of the rotor of the first MG 3 is identical to that of pole pairs of the rotor of the second MG 4, the ratio (f1/f2) of the first electrical frequency f1 to the second electrical frequency f2 is identical to the ratio of the rotational speed Nmg1 of the first MG 3 to the rotational speed Nmg2 of the second MG 4, which is expressed as Nmg1/Nmg2.

The ratio (f1/f2) of the first electrical frequency f1 to the second electrical frequency f2 will also be referred to as a two-MG frequency ratio (f1/f2) hereinafter.

FIG. 5 illustrates a first line L1 indicative of the first situation where the rotational speed Nmg1 of the first MG3, which is operating in the power running mode, is set to X [rpm] where X is a natural number, and the rotational speed Nmg2 of the second MG4 is set to 6×, which is six times the value X. FIG. 5 also illustrates a second line L2 indicative of the second situation where the rotational speed Nmg1 of the first MG3, which is operating in the regenerative mode, is set to −X [rpm] and the rotational speed Nmg2 of the second MG4 is set to the value 6×. The two-MG frequency ratio (f1/f2) in the first situation is set to 1/6 or approximately 16.7%. The two-MG frequency ratio (f1/f2) in the second situation is set to −1/6 or approximately −16.7%. The two-MG frequency ratio (f1/f2) in each of the first and second situations is identical to the ratio of the rotational speed Nmg1 to the rotational speed Nmg2 in a corresponding one of the first and second situations.

Each of the values 1/6 and −1/6 represents a reference ratio for the two-MG frequency ratio (f1/f2). The aforementioned at least one specific frequency-ratio ranges according to the overall embodiment include both a variable first specific frequency-ratio range SFR1 enclosing the reference ratio 1/6 as its center, and a variable second specific frequency-ratio range SFR2 enclosing the reference ratio −1/6 as its center. A dashed region enclosing the first line L1 represents the first specific frequency-ratio range SFR1 in FIG. 5, and a dashed region enclosing the second line L2 represents the second specific frequency-ratio range SFR2 in FIG. 5.

Let us assume that ±X is ±1000 [rpm] so that 6× is 6000 [rpm]. This assumption causes the first specific frequency-ratio range SFR1 to have a parallelogram region having a first pair of opposite sides and a second pair of opposite sides parallel to the first line L1 (see FIG. 5). One of the opposite sides of the first pair corresponds to the difference between 1000+100 [rpm] and 1000-100 [rpm] inclusive, and the other of the opposite sides of the first pair corresponds to the difference between 6000+100 [rpm] and 6000-100 [rpm] inclusive.

Similarly, this assumption causes the second specific frequency-ratio range SFR2 to have a parallelogram region having a first pair of opposite sides and a second pair of opposite sides parallel to the second line L2 (see FIG. 5). One of the opposite sides of the first pair corresponds to the difference between −1000+100 [rpm] and 4000−100 [rpm] inclusive, and the other of the opposite sides of the first pair corresponds to the difference between 6000+100 [rpm] and 6000−100 [rpm] inclusive.

Despite not being illustrated in FIG. 5, the at least one specific frequency-ratio ranges according to the present disclosure generally include predetermined specific frequency-ratio ranges respectively enclosing predetermined reference ratios of (1/6n) where n is an integer excluding zero. For example, the at least one specific frequency-ratio ranges according to the present disclosure include predetermined specific frequency-ratio ranges respectively enclosing predetermined reference ratios of 1/±12, and predetermined specific frequency-ratio ranges respectively enclosing predetermined reference ratios of 1/±24.

To sum up, the specific frequency-ratio ranges according to the present disclosure are each defined as a predetermined frequency-ratio range of the first electrical frequency f1 to the second electrical frequency f2 enclosing a corresponding one of predetermined reference ratios of (1/6n) where n is an integer except for zero. The predetermined frequency-ratio range for each of the specific frequency-ratio ranges is established such that a value of the two-MG frequency ratio (f1/f2) located within the predetermined frequency-ratio range of the first electrical frequency f1 to the second electrical frequency f2 may be subject to the sixth-order oscillation of the system voltage Vsys.

The following focuses on the specific frequency-ratio ranges where n=±1, that is, the first specific frequency-ratio range SFR1 enclosing the reference ratio 1/6, and the specific frequency-ratio range SFR2 enclosing the reference ratio −1/6 for facilitating the understanding of the specific frequency-ratio ranges.

Entering the ratio of the first electrical frequency f1 to the second electrical frequency f2 into the first or second frequency-ratio range SFR1 or SFR2 may cause the following problems.

For example, the period of the sixth-order harmonic components of the electrical-angle frequency of the first MG 3 operating in the PWM mode may be identical to the electrical-angle period of the second MG 4 operating in the rectangular control mode. Superimposing the sixth-order harmonic components of the electrical-angle frequency of the first MG 3 on the common system voltage Vsys may result in superimposition of the sinusoidal waveform of the sixth-order harmonic components of the electrical-angle frequency of the first MG 3 on the waveform of each of the drive pulses for the respective switching elements 24a1 to 24a6 of the second inverter 24. This may result in adverse effects on the s controllability of the second MG 4 in the rectangular control mode. The above typical patent document points out such a problem with reference to, for example, FIG. 3 thereof.

In addition to the descriptions in the typical patent document, the temperature characteristics of a current sensor used for measuring one phase current flowing in a three-phase AC MG may cause an offset error to contain in a value of the one phase current measured by the current sensor. The following describes what the offset error is. Specifically, a reference level of 0 [A] of a current sensor for one phase current is learned based on a level of the one phase current at the start-up of the three-phase AC MG. However, the middle point of the peak-to-peak amplitude of one phase current is offset with respect to the reference level of 0 [A] due to the temperature characteristics of the current sensor; this offset is expressed as the offset error.

Executing feedback control of the three-phase AC MG while such an offset error is contained in a value of one phase current measured by a corresponding current sensor may cause ripple in output torque of the three-phase AC MG due to the sixth-order harmonic components of the electrical-angle frequency of the three-phase AC MG.

Rectangular control of, for example, the second MG4 in the rectangular control mode is designed to adjust the phase of each of the drive pulses for each switching element of the second inverter 24 to control the output voltage of the second inverter 24 on the condition that the system voltage Vsys is maintained constantly. This may therefore cause variations of the system voltage Vsys to have great impacts on the controllability of the second MG 4 in the rectangular control mode.

To address the above problems, the technology disclosed in the typical patent document is configured to reduce one of the feedback control gain and the frequency of the carrier signal, which are used to control the second MG 4 in the PWM control mode when the ratio of the first electrical frequency f1 to the second electrical frequency f2 is 1/6. This deforms the sinusoidal waveform of the sixth-order harmonic components of the electrical-angle frequency of the first MG 3 to offset the waveform of the system voltage Vsys from each of the drive pulses used for the rectangular control mode (see FIG. 4 of the typical patent document). This reduces adverse effects due to the oscillations of the system voltage Vsys on the controllability of the second MG 4.

Note that the present disclosure defines usual drive, i.e. usual control, of the first MG 3 operating in the PWM control mode as the following means. Specifically, usual drive of the first MG 3 operating in the PWM control mode means drive of the first MG 3 operating in the PWM control mode while the two-MG frequency ratio (f1/f2) becomes out of the first and second specific frequency-ratio ranges SFR1 and SFR2.

In contrast, the present disclosure defines specific drive, i.e. specific control, of the first MG 3 operating in the PWM control mode as the following means. Specifically, specific drive of the first MG 3 operating in the PWM control mode means drive of the first MG 3 operating in the PWM control mode while the two-MG frequency ratio (f1/f2) becomes within the first specific frequency-ratio range SFR1 or the second specific frequency-ratio range SFR2.

Using the phrase "specific drive" enables the technology disclosed in the typical patent document to be represented as the technology that reduces one of the feedback control gain and the frequency of the carrier signal during the specific drive of the second MG 4 operating in the PWM control mode.

PWM control necessitates ten or more repetitions of one waveform cycle, i.e. one waveform period, of the carrier signal per one electrical-angular period of a motor-generator operating in the PWM control mode in order to generate a three-phase AC voltage, having a good sinusoidal waveform, for the motor-generator. Reducing the carrier frequency during the specific drive of the motor-generator to elongate the carrier cycle could reduce the number of repetitions of one waveform cycle of the carrier signal per one electrical-angular period of the motor-generator. This could result in the PWM control of the motor-generator being unstable.

That is, the technology disclosed in the typical patent document could deform the sinusoidal waveform of the sixth-order harmonic components of the electrical-angle frequency of the first MG 3 to reduce deterioration of the controllability of the second MG 4, but could deteriorate the controllability of the first MG 3. The technology disclosed in the typical patent document therefore could make it difficult to prevent the reduction in controllability of both the first and second MGs 3 and 4.

Additionally, paragraph [0041] of the typical patent document describes the sentence "a basic period can be changed", but fails to specifically describe what the basic period is, and how to change the basic period.

To address the above situations, the overall embodiment of the present disclosure performs an update-cycle changing task that changes the voltage-command update cycle for the PWM control of the first MG 3 during the specific drive of the first MG 3. This aims to reduce adverse effects, due to the oscillations of the system voltage Vsys, on the controllability of the second MG 4 while ensuring more stable the PWM control of the first MG 3.

The following describes in detail the update-cycle changing task for each of the specific embodiments included in the overall embodiment.

First Embodiment

Figure 6:
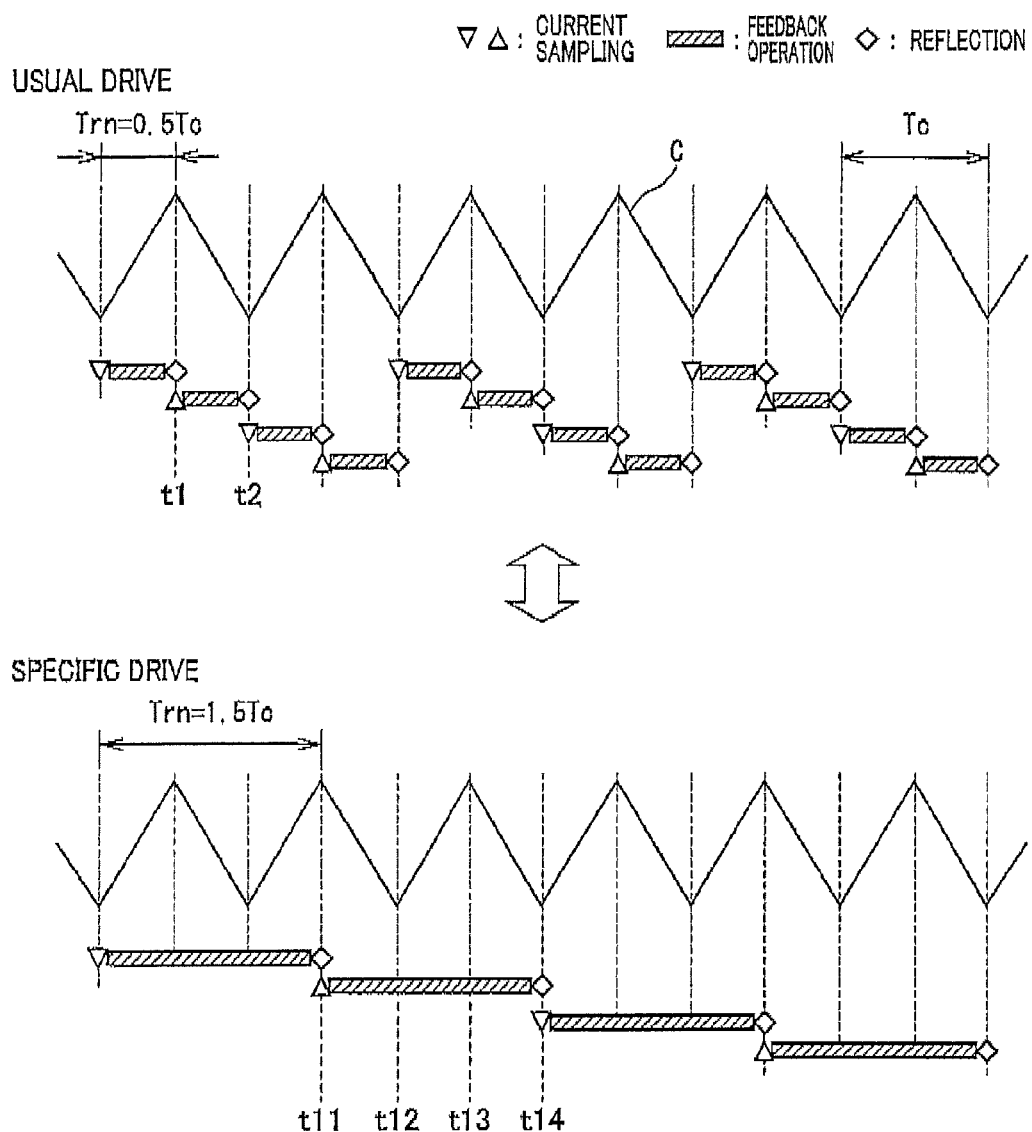
FIG. 6 is a timing chart schematically illustrating current-value sampling timings and measured current-value reflection timings on drive of the first MG during each of a usual drive and a specific drive according to the first embodiment.

First, the following describes the update-cycle changing task for the first embodiment with reference to FIG. 6.

FIG. 6 illustrates, during the usual drive of the first MG 3, the following parameters at its upper side:

(1) The carrier signal, to which reference character C is attached, during the usual drive of the first MG 3

(2) Current-value sampling timings by the first V- and W-phase current sensors 25 and 26 (see triangular marks in FIG. 6)

(3) Periods each of which is required to perform the PI feedback operations (FB operations) to calculate the command d- and q-axis voltages Vd1* and Vq1* (see hatched rectangular boxes in FIG. 3)

(4) Timings each representing a timing at which the PWM signal generator 35 to send the PWM drive signals to the first inverter 23 to reflect the results of the calculation by the PI controller 33 on drive of the first inverter 23 (see diamond-shaped marks in FIG. 3).

The first embodiment uses a triangular carrier signal as the carrier signal C, but one or more other embodiments can use a saw-tooth carrier signal.

During the usual drive of the first MG 3, the current values are measured by the first V- and W-phase current sensors 25 and 26 for each of the peaks including crests (positive peaks) and troughs (negative peaks) of the carrier signal C. The command d- and q-axis voltages Vd1* and Vq1* calculated based on the measured current values for each of the peaks are reflected on drive of the first inverter 23 at the timing of the next peak. For example, the command d- and q-axis voltages Vd1* and Vq1* calculated based on the measured current values for a peak (positive peak) at time t1 are reflected on drive of the first inverter 23 at the time t2 of the next peak (adjacent negative peak). The timing at which current values are measured by the first V- and W-phase current sensors 25 and 26 for a crest (positive peak) of the carrier signal C is represented as an upward triangular mark (Δ). Similarly, the timing at which current values are measured by the first V- and W-phase current sensors 25 and 26 for a trough (negative peak) of the carrier signal C is represented as a downward triangular mark (Λ).

Reflecting the command d- and q-axis voltages Vd1* and Vq1* calculated at a present operation cycle of the PI controller 33 on drive of the first inverter 23, i.e. the first MG 3, updates the previous command d- and q-axis voltages Vd1* and Vq1* calculated at the previous operation cycle of the PI controller 33 to the command d- and q-axis voltages Vd1* and Vq1* calculated at a present operation cycle of the PT controller 33. The following therefore defines the interval or cycle for which the command d- and q-axis voltages Vd1* and Vq2* calculated by the PT controller 33 are reflected on drive of the first inverter 23 as a voltage-command update cycle, more simply as update cycle. Reference character Trn attached to the term "update cycle" represents the length of the update cycle. The operation cycle of the PI controller 33 will also be referred to as a control cycle of the PT controller 33.

The specific embodiments of the present disclosure commonly establishes the update cycle Trn during the usual drive of the first MG 3 to be half the period of the carrier signal C, represented by reference character Tc. In other words, the update cycle I'm during the usual drive of the first MG 3 is one half of the carrier cycle Tc.

Additionally, during the specific drive of the first MG 3, the length of each operation cycle of the PI controller, which is illustrated by the length of a corresponding hatched box, is identical, to the update cycle Trn.

In contrast, FIG. 6 illustrates, during the specific drive of the first MG 3, the same parameters (1) to (4) at its lower side.

Specifically, the first embodiment establishes the update cycle Trn during the specific drive of the first MG 3 to be one and half times longer than the carrier cycle Tc. That is, the update cycle Trn during the specific drive of the first MG 3 is three times longer than the update cycle Trn during the usual drive of the first MG 3.

For example, the command d- and q-axis voltages Vd1* and Vq1* calculated based on the measured current values for a peak (positive peak) at time t11 are not reflected on drive of the first inverter 23 at the time t12 of the next peak (adjacent negative peak) after lapse of the half of the carrier cycle Tc since the dine t11. The command d- and q-axis voltages Vd1* and Vq1* calculated based on the measured current values for a crest (positive peak) at the time t11 are also not reflected on drive of the first inverter 23 at the time t13 of the next peak (adjacent positive peak) after lapse of the one carrier cycle Tc since the time t11. At the time t14 of the peak (adjacent negative peak), the command d- and q-axis voltages Vd1* and Vq1* calculated based on the measured current values for a crest (positive peak) at the time t11 are reflected on drive of the first inverter 23 after lapse of the one and half of the carrier cycle Tc since the time t11.

In particular, the update cycle changer 39 instructs the PI controller 33 to increase the length of the operation cycle of the PI controller 33 during the specific drive of the first MG 3 to be three times longer than the length of the operation cycle of the PI controller 33 during the usual drive of the first MG 3 (see the lower side of FIG. 6). This is illustrated by the solid arrow between the blocks 33 and 39 in FIG. 3.

Otherwise, the update cycle changer 39 instructs the PWM signal generator 35 to increase the PWM-signal output cycle of the PWM signal generator 35 during the specific drive of the first MG 3 to be three times longer than the PWM-signal output cycle of the PWM signal generator 35 during the usual drive of the first MG 3. In other words, the update cycle changer 39 instructs the PWM signal generator 35 to output the PWM drive signals once every three operation periods of the PI controller 33 during the specific drive of the first MG 3.

The specific feature that the update cycle Trn during the specific drive of the first MG 3 is three times longer than the update cycle Trn during the usual drive of the first MG 3 reduces the responsivity of the first MG 3 to the PWM control during the specific drive of the first MG 3 as compared with the responsivity of the first MG 3 to the PWM control during the usual drive of the first MG 3. This deforms the sinusoidal, waveform of the sixth-order harmonic components of the electrical-angle frequency of the first MG 3, which are synchronized with the system voltage Vsys, thus offsetting the waveform of the system voltage Vsys from each of the drive pulses used for the rectangular control mode. This therefore reduces adverse effects due to the oscillations of the system voltage Vsys on the controllability of the second MG 4.

Figure 7:
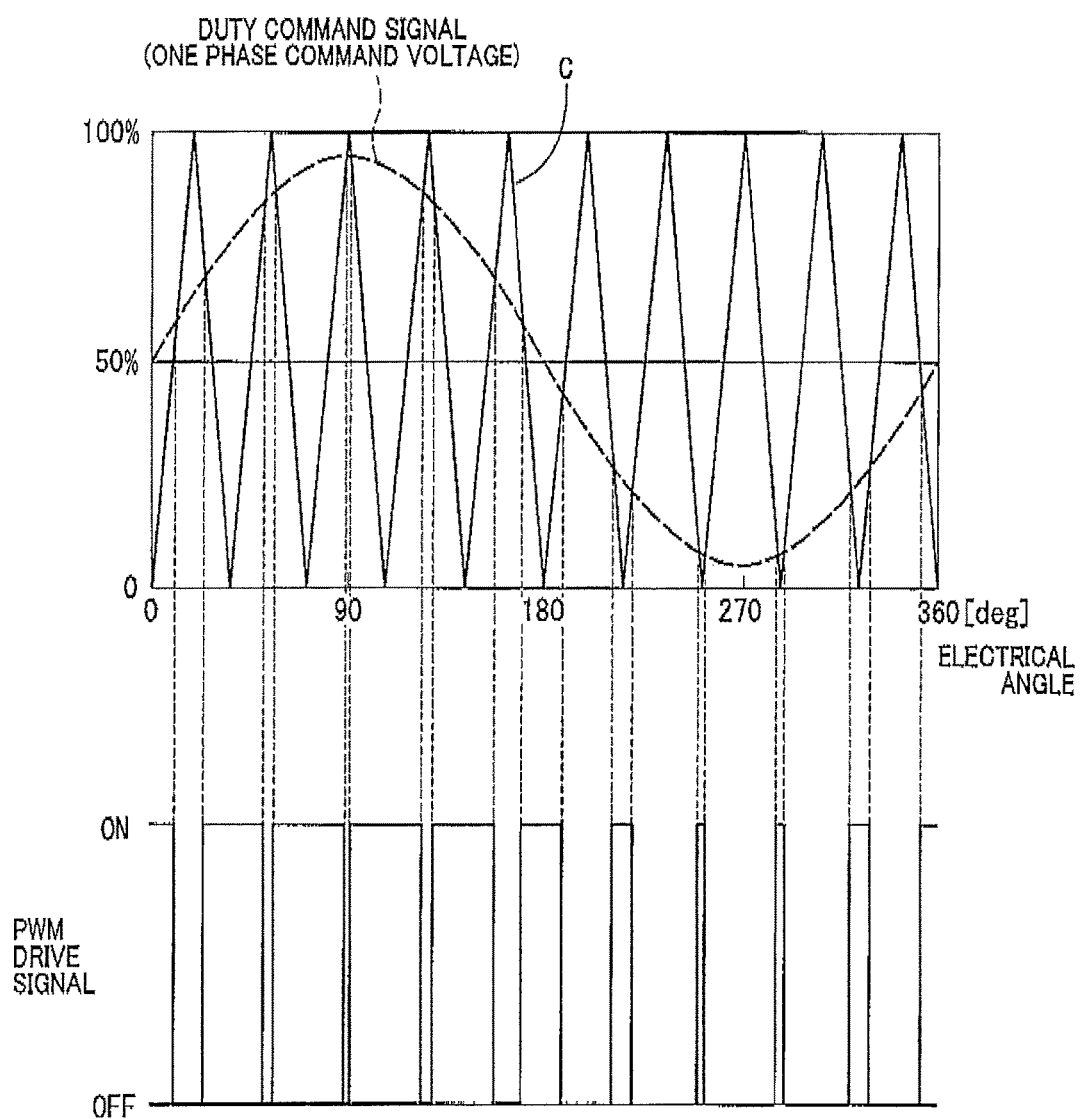
FIG. 7 is a signal waveform chart schematically illustrating the waveform of a carrier signal, the waveform of a duty command signal, and the waveform of a PWM drive signal according to the first embodiment.

Referring to FIG. 7, as described above, the PWM-signal generator 35 compares in amplitude each phase command voltage Vk1 (where k=v, and w), i.e. each duty signal, with the triangular carrier signal C. Then, the PWM-signal generator 35 generates the corresponding upper-arms drive signal with a value of the duty; the value of the duty matches with the period for which the corresponding duty command signal has exceeded the triangular carrier signal C.

As described above, such PWM control necessitates ten or more repetitions of one waveform cycle of the carrier signal C per one electrical-angular period of the first MG 3 in order to generate a three-phase AC voltage, having a good sinusoidal waveform, for the first MG 3.

For example, let us consider a comparative example. The comparative example has a substantially identical structure of the first embodiment except for the following points. Specifically the comparative example uses, as the first MG 3, an MG having six pole pairs, so that one electrical-angular period of the first MG 3 upon the first MG 3 turning at 200 rpm, i.e. 33.3 Hz, is 5 ms. Setting the carrier cycle Tc to 200 μs results in the number of repetitions of one waveform cycle of the carrier signal C per one electrical-angular period of the first MG 3 being 25. The number of repetitions of one waveform cycle of the carrier signal C is more than ten, so that the number of repetitions of one waveform cycle of the carrier signal C for the assumed first MG 3 is sufficient during the usual drive of the assumed first MG 3.

The next point of the comparative example is to use the technology disclosed in the typical patent document to change the period Tc of the carrier signal C.

Figure 8:
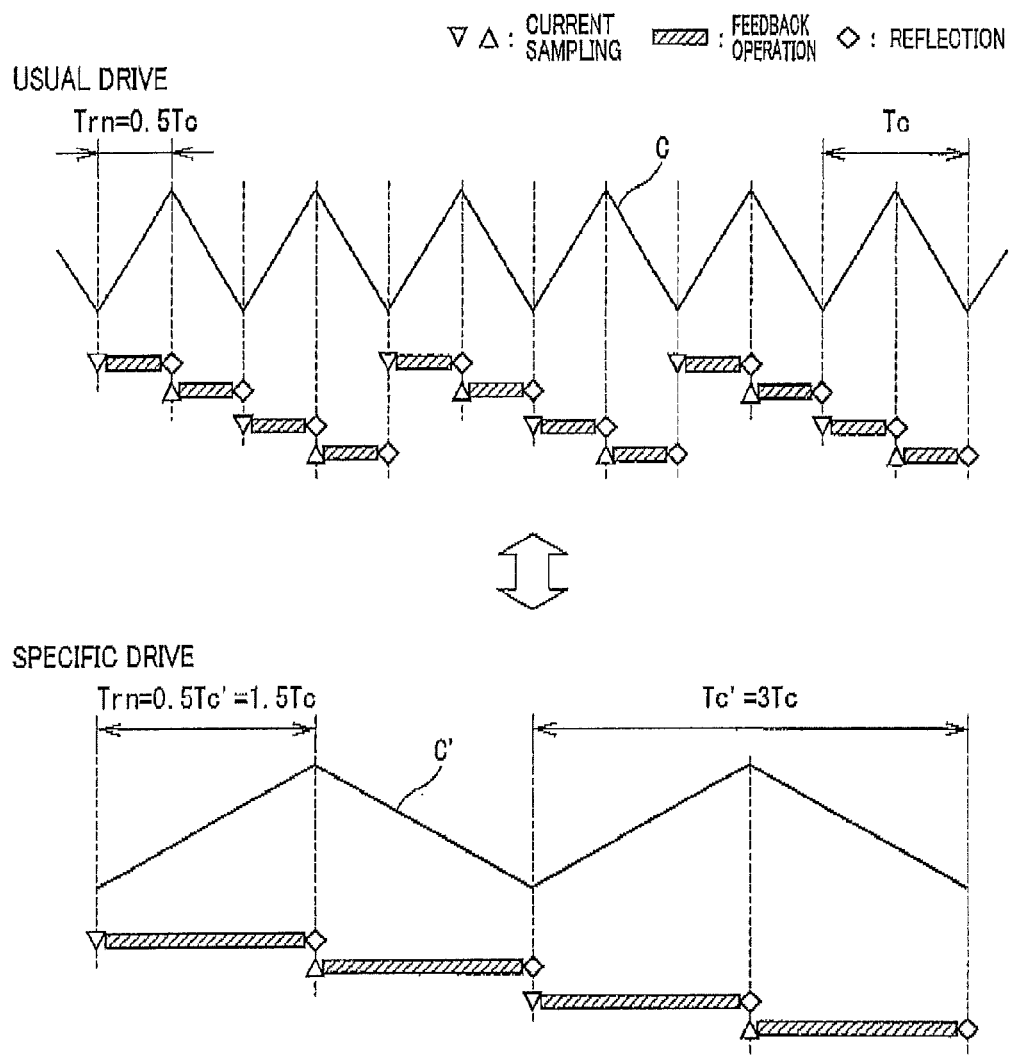
FIG. 8 is a timing chart schematically illustrating current-value sampling timings and measured current-value reflection timings on drive of the first MG during each of a usual drive and a specific drive according to a comparative example of the first embodiment.

FIG. 8 schematically illustrates, during the usual drive of the first MG 3, the same parameters (1) to (4) at its upper side in the comparative example, and illustrates, during the specific drive of the first MG 3, the same parameters (1) to (4) at its lower side in the comparative example.

Specifically, as illustrated in FIG. 8, the comparative example sets the period Tc' of a carrier signal C' during the specific drive of the first MG 3 to be three-times longer the period Tc of the carrier signal C during the usual drive of the first MG 3.

This results in the update cycle Trn during the specific drive of the first MG 3 being half the period Tc' of the carrier signal C' during the specific drive of the first MG 3, in other words, being one and half times longer than the carrier cycle Tc of the carrier signal C during the usual drive of the first MG 3. This achieves an advantageous effect of reducing the responsivity of the first MG 3 to the PWM control during the specific drive of the first MG 3.

Unfortunately, the comparative example causes the carrier cycle Tc' during the specific drive of the first MG 3 to be three-times longer than the carrier cycle Tc during the usual drive of the first MG 3. This results in the number of repetitions of one waveform cycle of the carrier signal C' per one electrical-angular period of the first MG 3 during the specific drive of the first MG 3 being approximately 8.3, i.e. 8. This eight repetitions of one waveform cycle of the carrier signal C' per one electrical-angular period of the first MG 3 during the specific drive of the first MG 3 is lower than twenty-five repetitions of one waveform cycle of the carrier signal C per one electrical-angular period of the first MG 3 during the specific drive of the first MG 3. The number of repetitions of one waveform cycle of the carrier signal C' per one electrical-angular period of the first MG 3 during the specific drive of the first MG 3 is lower than ten, resulting in difficulty generating a three-phase AC voltage having a good sinusoidal waveform for the first MG 3. This may result in the PWM control of the first MG 3 being unstable.

In contrast, the first embodiment maintains the carrier cycle Tc during the specific drive of the first MG 3 to be identical to the carrier cycle Tc during the usual drive of the first MG 3. This enables the number of repetitions of one waveform cycle of the carrier signal C per one electrical-angular period of the first MG 3 during the specific drive of the first MG 3 to be sufficiently ensured. This therefore improves the PWM control stability for the first MG 3.

Next, the following describes an additional advantageous effect of the first embodiment in view of current sampling timing.

Referring to FIG. 6, the first embodiment establishes the update cycle Trn during the specific drive of the first MG 3 to be one and half times longer than carrier cycle Tc. Then, the first embodiment alternately obtains, i.e. samples, the set of V- and W-phase current values measured at the timing of a crest (positive peak) of the carrier signal C and the set of V- and W-phase current values measured at the timing of a trough (negative peak) thereof; each of the crest (positive peak) and the trough (negative peak) of the carrier signal C corresponds to the start timing of each update cycle Trn.

If the update cycle Trn during the specific drive of the first MG 3 was set to be equal to the carrier cycle Tc, the start timing of each update cycle Trn could be always the timing of a trough (negative peak) of the carrier signal C or a crest (positive peak) of the carrier signal C. In contrast, establishing the update cycle Trn during the specific drive of the first MG 3 to be one and half times longer than carrier cycle Tc enables each of the start timings of the sequential update cycles Trn to match with the timing of alternate one of a trough (negative peak) and a crest (positive peak) of the carrier signal C.

The inventors focus on the difference between an actual current value flowing through each phase winding of the first MG 3 and a corresponding current value measured by the current sensor 25 or 26. Referring to FIGS. 9A and 9B, the PWM-signal generator 35 turns on the upper-arm switching element 23a3 while the corresponding duty command signal has exceeded the triangular carrier signal C. The upper-arm switching element 23a3 for the V-phase winding is an example of the upper-arm switching elements 23a1, 23a3, and 23a5.

Additionally, the PWM-signal generator 35 turns off the upper-arm switching element 23a3 while the corresponding duty command signal is lower in amplitude than the triangular carrier signal C. Note that the PWM-signal generator 35 performs on-off operations of the corresponding lower-arm switching element 23a4 complementarily with respect to the on-off operations of the upper-arm switching element 23a1.

On-off operations of the upper-arm switching element 23a1 cause an actual current flowing through the corresponding V-phase winding to change while repeating increase and decrease thereof like a triangular waveform. The output of each of the current sensors 25 and 26 usually delays by a few microseconds with respect to the corresponding actual current. This delay causes a current value Is_peak measured by the current sensor 25 at the timing of a crest (positive peak) of the carrier signal C to positively offset from the corresponding actual current Iv (see FIG. 9C). Similarly, this delay causes a current measured by the current D sensor 25 at the timing of a trough (negative peak) of the carrier signal C to negatively offset from the corresponding actual current Iv (see FIG. 9C).

Let us consider a first case where the MG controller 20 performs the feedback operation using, for each phase current, only the measured current values sampled at either the respective positive peaks or the respective negative peaks of the carrier signal C. As a typical example, the first case uses, for each phase current, only the measured current values Is_peak sampled at the respective positive peaks of the carrier signal C (see FIG. 9C).

FIG. 9C shows that the average value (see reference character Is AVERAGE) of the measured current values Is_peak of each phase current sampled at the respective positive peaks of the carrier signal C deviates from the average value (see reference character ACTUAL-CURRENT AVERAGE) of the actual current values of the corresponding phase current.

In contrast, let us consider a second case where the MG controller 20 performs the feedback operation to calculate the command d- and q-axis voltages Vd1* and Vq1* using, for each phase current, the measured current values sampled at alternate one of the positive and negative peaks of the carrier signal C. FIG. 9D illustrates the measured current value sampled at each of the positive peaks of the carrier signal C as the reference character I_peak. Similarly, FIG. 9D illustrates the measured current value sampled at each of the negative peaks of the carrier signal C as the reference character I_val.

FIG. 9D shows that the average value (see reference character Is AVERAGE) of each phase current sampled at alternate one of the positive and negative peaks of the carrier signal C substantially matches with the average value (see reference character ACTUAL-CURRENT AVERAGE) of the actual current values of the corresponding phase current. Thus, the first embodiment achieves an additional advantageous effect of improving the accuracy of the feedback operation.

Figure 10:
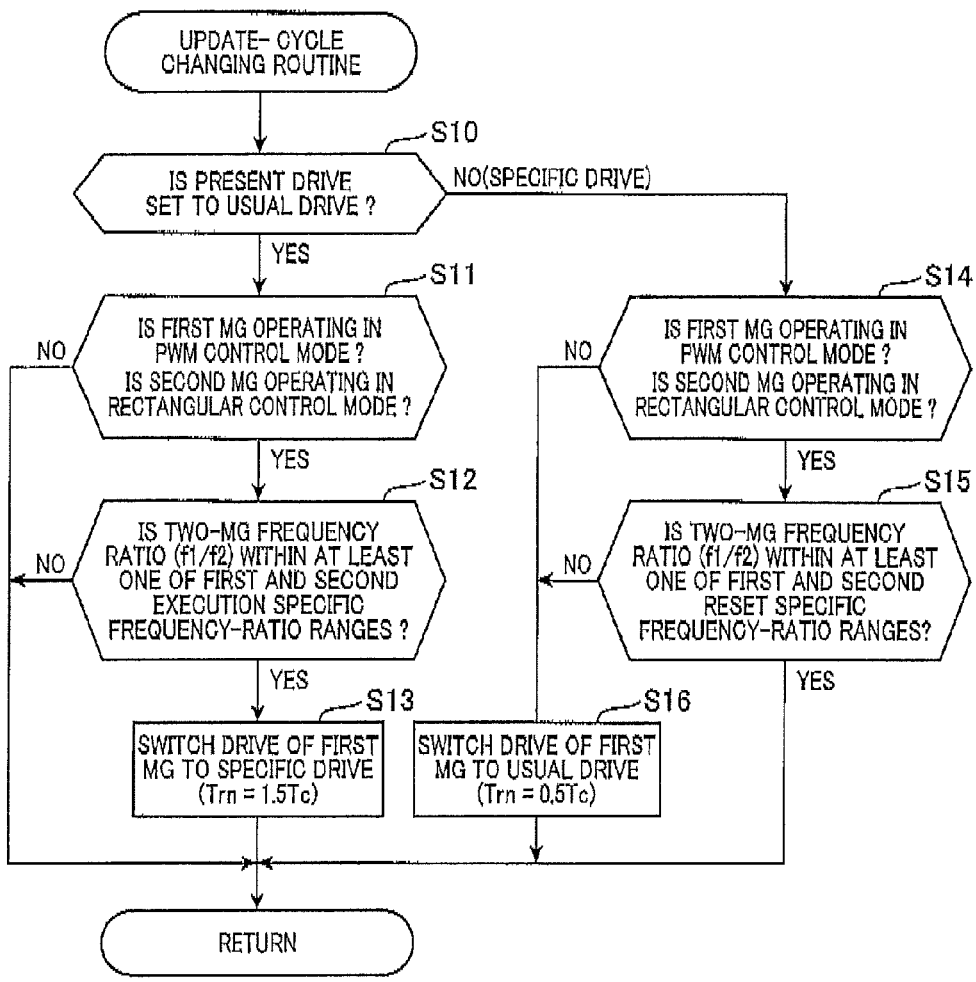
FIG. 10 is a flowchart schematically illustrating an update-cycle changing routine according to the first embodiment.
Figure 11:
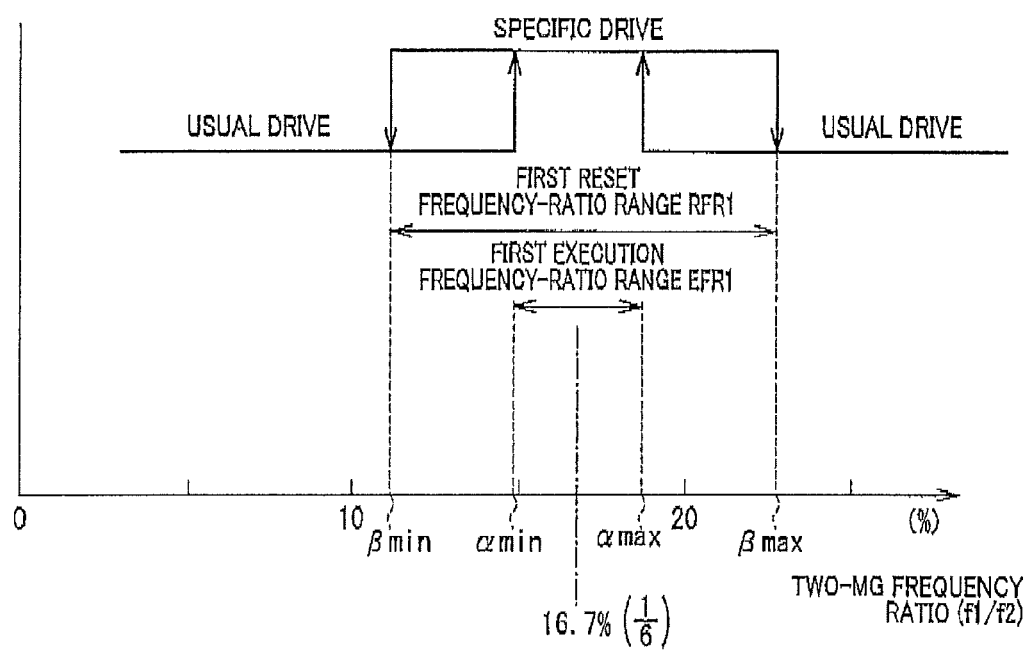
FIG. 11 is a timing chart schematically illustrating how drive of the first MG switches between the usual drive and the specific drive according to the first embodiment.

Next, the following describes the update-cycle changing task carried out by the MG controller 20, i.e. the combination of the frequency ratio determiner 38 and update cycle changer 39, with reference to FIGS. 10 and 11. In other words, the update-cycle changing task represents a task for switching drive of the first MG 3 between the usual drive and the specific drive. FIG. 10 illustrates an update-cycle changing routine, which is stored in, for example, the memory of the MG controller 20, corresponding to the update-cycle changing task, and FIG. 11 schematically illustrates how drive of the first MG switches between the usual drive and the specific drive.

Note that the MG controller 20 can be designed to execute the update-cycle changing routine in synchronization with the carrier cycle Tc or every predetermined constant period of, for example, 2 ms preferably shorter than the carrier cycle Tc.

Upon starting the update-cycle changing routine, the MG controller 20 determines whether the present drive of the first MG is set to the usual drive or the specific drive thereof in step S10.

Upon determining that the present drive of the first MG is set to the usual drive thereof (YES in step S10), the update-cycle changing routine proceeds to step S11, and otherwise proceeds to step S14.

In step S11, the MG controller 20 determines whether the first MG 3 is operating in the PWM control mode and the second MG 4 is operating in the rectangular control mode. Upon determining that the first MG 3 is operating in the PWM control mode and the second MG 4 is operating in the rectangular control mode (YES in step S11), the update-cycle changing routine proceeds to step S12.

In step S12, the MG controller 20 determines whether the two-MO frequency ratio (f1/f2) is within at least one of first and second execution specific frequency-ratio ranges EFR1 and EFR2 described later.

Upon determining that the two-MG frequency ratio (f1/f2) is within at least one of the first and second execution frequency-ratio ranges EFR1 and EFR2 (YES in step S12), the MG controller 20 determines that the execution condition of the specific drive of the first MG 3 is satisfied. Then, the MG controller 20 switches drive of the first MG 3 from the usual drive to the specific drive in step S13. In step S13, the MG controller 20 changes the value of the update cycle Trn from the value of one half of the carrier cycle Tc, i.e. 0.5Tc, to the value that is one and half times longer than the carrier cycle Tc, i.e., 1.5Tc. Thereafter, the MG controller 20 terminates the update-cycle changing routine.

Otherwise, upon determining that the first MG 3 is not operating in the PWM control mode or the second MG 4 is not operating in the rectangular control mode (NO in step S11), the MG controller 20 terminates the update-cycle changing routine, continuously executing the usual drive of the first MG 3. Similarly, upon determining that the two-MG frequency ratio (f1/f2) is out of both the first and second execution frequency-ratio ranges EFR1 and EFR2 (NO in step S12), the MG controller 20 terminates the update-cycle changing routine, continuously executing the usual drive of the first MG 3.

Otherwise, upon determining that the present drive of the first MG is set to the specific drive thereof (NO in step S10), the update-cycle changing routine proceeds to step S14.

In step S14, the MG controller 20 determines whether the first MG 3 is operating in the PWM control mode and the second MG 4 is operating in the rectangular control mode like step S11.

Upon determining that the first MG 3 is operating in the PWM control mode and the second MG 4 is operating in the rectangular control mode (YES in step S14), the update-cycle changing routine proceeds to step S15. In step S15, the MG controller 20 determines whether the two-MG frequency ratio (f1/f2) is within at least one of first and second reset frequency-ratio ranges RFR1 and RFR2 described later.

Upon determining that the two-MG frequency ratio (f1/f2) is within at least one of the first and second reset frequency-ratio ranges RFR1 and RFR2 (YES in step S15), the MG controller 20 determines that the reset condition of the specific drive of the first MG 3 is not satisfied. Then, the MG controller 20 terminates the update-cycle changing routine, continuously executing the specific drive of the first MG 3.

Otherwise, upon determining that the two-MG frequency ratio (f1/f2) is out of both the first and second reset frequency-ratio ranges RFR1 and RFR2 (NO in step S15), the MG controller 20 determines that the reset condition of the specific drive of the first MG 3 is satisfied.

Then, the MG controller 20 switches drive of the first MG 3 from the specific drive to the usual drive in step S16. In step S16, the MG controller 20 changes the value of the update cycle Trn from the value that is one and half longer than the carrier cycle Tc, i.e. 1.5Tc, to the value of one half of the carrier cycle Tc, i.e., 0.5Tc. Thereafter, the MG controller 20 terminates the update-cycle changing routine.

The first execution frequency-ratio range EFR1 serves as the first specific frequency-ratio range SFR1 upon determination of whether to switch drive of the first MG 3 from the usual drive to the specific drive. The first reset frequency-ratio range RFR1 serves as the first specific frequency-ratio range SFR1 upon determination of whether to switch drive of the first MG 3 from the specific drive to the usual drive.

Similarly, the second execution frequency-ratio range EFR2 serves as the second specific frequency-ratio range SFR2 upon determination of whether to switch drive of the first MG 3 from the usual drive to the specific drive. The second reset frequency-ratio range RFR2 serves as the second specific frequency-ratio range SFR2 upon determination of whether to switch drive of the first MG 3 from the specific drive to the usual drive.

The following describes the relationship between the first execution frequency-ratio range EFR1 as a typical example of the first and second execution frequency-ratio ranges EFR1 and EFR2 and the corresponding first reset frequency-ratio range RFR1 as an example of the first and second reset frequency-ratio ranges RFR1 and RFR2 with reference to FIG. 11.

Referring to FIG. 11, the first execution frequency-ratio range EFR1 and the corresponding first reset frequency-ratio range RFR1 are each defined to enclose the reference ratio 1/6 (16.7%) as its center such that the first execution frequency-ratio range EFR1 is relatively narrower than the first reset frequency-ratio range RFR1. In other words, the first reset frequency-ratio range RFR1 is relatively wider than the first execution frequency-ratio range EFR1. For example, the first execution frequency-ratio range EFR1 is set to be ±10% with, respect to the reference ratio 1/6 (16.7%), and the first reset frequency-ratio range RFR1 is set to be ±30% with respect to the reference ratio 1/6 (16.7%).

In particular, the first reset frequency-ratio range RFR1 has an upper limit βmax greater than an upper limit αmax of the first execution frequency-ratio range EFR1. The first reset frequency-ratio range RFR1 also has a lower limit βmin smaller than a lower limit αmin of the first execution frequency-ratio range EFR1. Specifically, the first execution frequency-ratio range EFR1 is included in the first reset frequency-ratio range RFR1.

In other words, the relationship between the two-MG frequency ratio (f1/f2) and each of the usual drive and the specific drive has a hysteresis characteristic (see FIG. 11). For example, drive of the first MG 3 is switched to the specific drive when the two-MG frequency ratio (f1/f2) is set to be within the first execution frequency-ratio range EFR1. Thereafter, even if the two-MG frequency ratio (f1/f2) is set to be out of the first execution frequency-ratio range EFR1, the specific drive of the first MG 3 is maintained until two-MG frequency ratio (f1/f2) is set to be within the first reset frequency-ratio range RFR1.

The hysteresis characteristic of how the first MG 3 is switched between the usual drive and the specific drive prevents hunting of the update cycle Trn, i.e. frequent switching of the update cycle Trn between 0.5Tc and 1.5Tc, while the two-MG frequency ratio (f1/f2) is changing across the upper or lower limit of the first execution frequency-ratio range EFR1. This therefore prevents PWM control of the first MG 3 from being unstable.

The relationship between the first execution frequency-ratio range EFR1 and the first reset frequency-ratio range RFR1 has been described according to FIG. 11. Similarly, the relationship between the second execution frequency-ratio range EFR2 and the second reset frequency-ratio range RFR2 can have been described in the same manner as the relationship between the first execution frequency-ratio range EFR1 and the first reset frequency-ratio range RFR1.

The above MG controller 20 according to the first embodiment switches the voltage-command update cycle Trn from 0.5Tc to 1.5Tc upon determination that the two-MG frequency ratio (f1/f2) is within at least one of the first and second execution frequency-ration ranges EFR 1 and EFR2 while the first MG 3 is operating in the PWM control mode. This switching reduces the responsivity of the first MG 3 to the PWM control, thus deforming the sinusoidal waveform of the sixth-order harmonic components of the electrical-angle frequency of the first MG 3, which are synchronized with the system voltage Vsys. This reduces deterioration of the controllability of the second MG 4 operating in the regenerative control mode due to the oscillations of the system voltage Vsys.

The above MG controller 20 also maintains the carrier cycle Tc during the specific drive of the first MG 3, which is identical to the carrier cycle Tc during the usual drive of the first MG 3. This ensures the number of repetitions of one waveform cycle of the carrier signal C per one electrical-angular period of the first MG 3, which is sufficient for the PWM control to generate a three-phase AC voltage having a good sinusoidal waveform. The above MG controller 20 further sets the voltage-command update cycle Trn to 1.5Tc during the specific drive of the first MG 3 as compared with 0.5Tc during the usual drive of the first MG 3. This setting prevents excessive reduction of the responsivity of the first MG 3 to the PWM control, thus maintaining at a high level the stability of the PWM control of the first MG 3.

To sum up, the above MG controller 20 prevents the reduction in controllability of both, the first and second MGs 3 and 4 even upon determination that drive of the first MG 3 is switched to the specific drive.

Additionally, the above MG controller 20 according to the first embodiment performs the feedback operation to calculate the command B- and q-axis voltages Vd1* and Vq1* using, for each phase current, the measured current values sampled at alternate one of the positive and negative peaks of the carrier signal C. This enables the average value of each phase current sampled at alternate one of the positive and negative peaks of the carrier signal C to substantially match with the average value of the actual Current values of the corresponding phase current. This therefore improves the accuracy of the feedback operation, and makes it possible to reduce the operation load required to calculate the average value of each phase current sampled at alternate one of the positive and negative peaks of the carrier signal C as compared with the corresponding operation load described later.

In particular, the above MG controller 20 according to the first embodiment establishes the first execution and reset frequency-ratio ranges EFR1 and RFR1 and the second execution and reset frequency-ratio ranges EFR2 and RFR2. Each of the relationship between the first execution and reset frequency-ratio ranges EFR1 and RFR1 and that between the second execution and reset frequency-ratio ranges EFR2 and RFR2 provides a hysteresis characteristic of how the first MO 3 is switched between the usual drive and the specific drive. This prevents hunting of the update cycle Trn while the two-MG frequency ratio (f1/f2) is changing across the upper or lower limit of the first or second execution frequency-ratio range EFR1 or EFR2.

Second Embodiment

Figure 12:
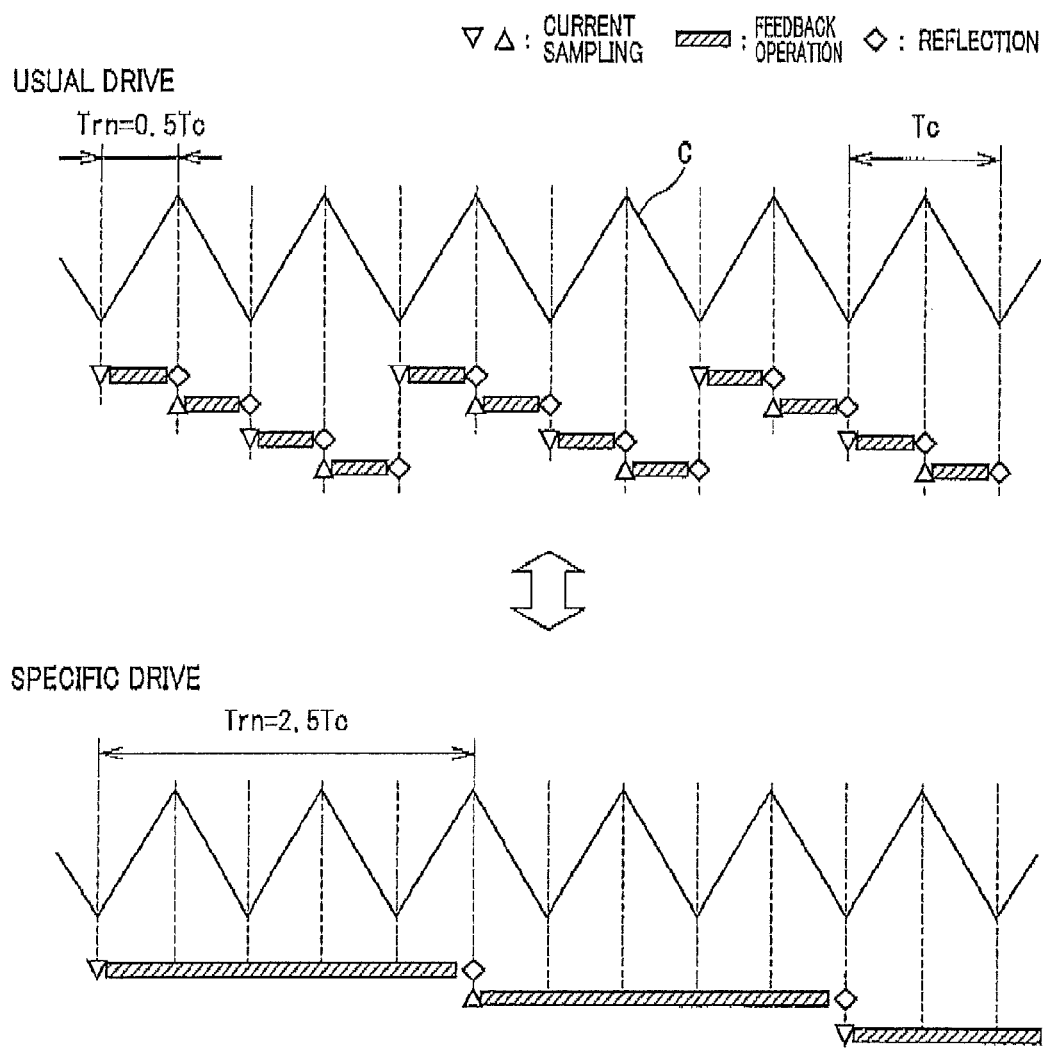
FIG. 12 is a timing chart schematically illustrating current-value sampling timings and measured current-value reflection timings on drive of the first MG during each of the usual drive and the specific drive according to the second embodiment.

Next, the following describes the update-cycle changing task for the second embodiment with reference to FIG. 12.

The MG controller 20 according to the first embodiment switches the voltage-command update cycle Trn from 0.5Tc to 1.5Tc, but the MG controller according to the second embodiment switches the voltage-command update cycle Trn from 0.5Tc to 2.5Tc, and maintains the carrier cycle Tc during the specific drive of the first MG 3 (see FIG. 12).

Like the first embodiment, the MG controller 20 according to the second embodiment performs the feedback operation to calculate the command d- and q-axis voltages Vd1* and Vq1* using, for each phase current, the measured current values sampled at alternate one of the positive and negative peaks of the carrier signal C.

The other structure of the MG controller 20 of the second embodiment is identical to the corresponding structure of the MG controller 20 of the first embodiment.

The MG controller 20 of the second embodiment substantially achieves the same advantages as those achieved by the MG controller 20 of the first embodiment.

In particular, the MG controller 20 according to the second embodiment reduces the responsivity of the first MG 3 to the PWM control while ensuring the number of repetitions of one waveform cycle of the carrier signal C per one electrical-angular period of the first MG 3. This prevents the reduction in controllability of both the first and second MGs 3 and 4 even upon determination that drive of the first MG 3 is switched to the specific drive.

The above MG controller 20 according to each of the first and second embodiments sets the voltage-command update cycle Trn during the specific drive of the first MG 3 to be (m+5) times longer than the voltage-command update cycle Trn during the usual, drive of the first MG 3 where m is a natural number. This setting enables sampling of the measured current values for each phase current at alternate one of the positive and negative peaks of the carrier signal C. This prevents phase-current offset for each of the three-phase currents due to sampling of the corresponding phase current values at only the respective positive peaks or the negative peaks of the carrier signal C, thus improving the) accuracy of the feedback operation.

As described above, the MG controller 20 according to each of the first and second embodiments can set the voltage-command update cycle Trn during the specific drive of the first MG 3 to be 3.5, 4.5, or another greater value times longer than the carrier cycle Tc. Unfortunately, an extra increase of the voltage-command update cycle Trn during the specific drive of the first MG 3 might overly reduce the responsivity of the first MG 3 to the PWM control, resulting in the PWM control being more unstable.

In view of avoiding such an extra increase of the voltage-command update cycle Trn, the present disclosure provides (1) The first embodiment, as a first efficient structure, which sets the voltage-command update cycle Trn during the specific drive of the first MG 3 to be 1.5 times longer than the carrier cycle Tc (2) The second embodiment, as a second efficient structure, which sets the voltage-command update cycle Trn during the specific drive of the first MG 3 to be 2.5 times longer than the carrier cycle Tc.

This reduces deterioration of the controllability of the second MG 4 operating in the regenerative control mode due to the oscillations of the system voltage Vsys while preventing the responsivity of the first MG 3 to the PWM control from excessively decreasing.

Third Embodiment

Figure 13:
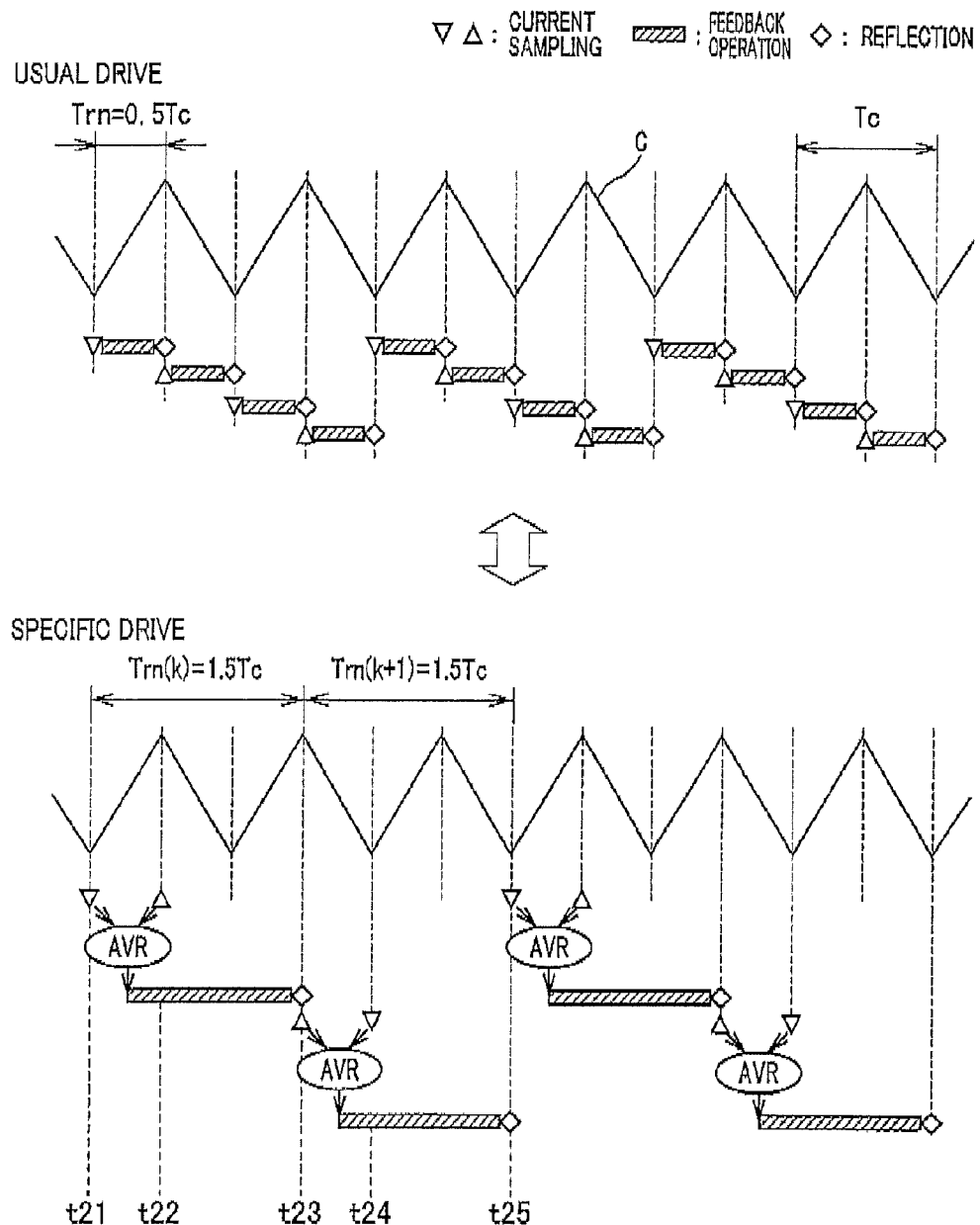
FIG. 13 is a timing chart schematically illustrating current-value sampling timings and measured current-value reflection timings on drive of the first MG during each of the usual drive and the specific drive according to the third embodiment.

Next, the following describes the update-cycle changing task for the third embodiment with reference to FIG. 13.

The MG controller 20 according to the third embodiment uses a specific approach to sample the measured phase current values for each phase current during the specific drive of the first MG 3, which differs from the approach described in the first embodiment.

Specifically, the MG controller 20 according to the third embodiment performs the feedback operation during the specific drive of the first MG 3 using, for each phase current, an average value of measured current values sampled at adjacent negative and positive peaks of the carrier signal C whenever the adjacent negative and positive peaks of the carrier signal C appear at every voltage-command update cycle Trn.

FIG. 13 for example illustrates that the voltage-command update cycle Trn is set to be 1.5 times longer than the carrier cycle Tc during the specific drive of the first MG 3. FIG. 13 also for example illustrates that the carrier signal C is oscillating in the sequential order of a first trough, a first crest, a second trough, and a second crest for a k-th voltage-command update cycle Trn(k) where k is a given natural number.

At that time, the MG controller 20 samples, for each phase current, measured current values at the timing t21 of the first trough and the timing t22 of the first crest. Then, the MG controller 20 calculates, for each phase, an average value AVR(k) of the measured current values sampled at the respective timing t21 of the first trough and the timing t22 of the first crest of the carrier signal C. Then, the MG controller 20 calculates the command d- and q-axis voltages Vd1* and Vq1* using, for each phase current, the average value AVR(k), and reflects the calculated results on drive of the first inverter 23 at the timing t23 of the second crest of the carrier signal C.

During the next (k+1)-th, voltage-command update cycle Trn(k+1), the MG controller 20 samples, for each phase current, measured current values at the timing t23 of the second crest CR1(k) and the timing t24 of a, third trough, and calculates, for each phase, an average value AVR(k+1) of the measured current values sampled at the respective timing t23 of the second crest and the timing t24 of the third trough of the carrier signal C. Then, the MG controller 20 calculates the command d- and q-axis voltages Vd1* and Vq1* using, for each phase current, the average value AVR(k+1), and reflects the calculated results on drive of the first inverter 23 at the timing t25 of a third trough of the carrier signal C.

The other structure of the MG controller 20 of the third embodiment is identical to the corresponding structure of the MG controller 20 of the first embodiment.

The MG controller 20 of the third embodiment substantially achieves the same advantages as those achieved by the MG controller 20 of the first embodiment.

In particular, the MG controller 20 according to the third embodiment performs the feedback operation during the specific drive of the first MG 3 using, for each phase current, an average value of measured current values sampled at adjacent negative and positive peaks of the carrier signal C whenever the adjacent negative and positive peaks of the) carrier signal C appear at every voltage-command update cycle Trn. This prevents phase-current offset for each of the three-phase currents due to sampling of the corresponding phase current values at only the respective positive peaks or the negative peaks of the carrier signal C. This therefore improves the accuracy of the feedback operation.

The third embodiment can set the voltage-command update cycle Trn during the specific drive of the first MG 3 to be 2.0 times, in addition to 1.5 times for the first embodiment or 2.5 times for the second embodiment, longer than the carrier cycle Tc.

The following describes various modifications based on at least one of the above embodiments.

Each of the first to third embodiments defines the two-MG frequency ratio (f1/f2) in a case where the MG controller 20

(1) Controls the first inverter 23 to cause the first MG 3 to operate in the PWM control mode (2) Controls the second inverter 24 to cause the second MG 4 to operate in the rectangular control mode while the rotational speed Nmg1 of the first MG 3 is lower than the rotational speed Nmg2 of the second MG 4.

The present disclosure is however not limited to the embodiments.

Specifically, the present disclosure can define the two-MG frequency ratio (f1/f2) in a case where the MG controller 20

(1) Controls the first inverter 23 to cause the first MG 3 to operate in the rectangular control mode (2) Controls the second inverter 24 to cause the second MG 4 to operate in the PWM control mode while the rotational speed Nmg1 of the first MG 3 is higher than the rotational speed Nmg2 of the second MG 4.

In this modification, the phrases "the first MG 3 operating in the PWM control mode" and "the second MG 4 operating in the rectangular control mode" in the above descriptions should be replaced with "the second MG 4 operating in the PWM control mode" and "the first MG 3 operating in the rectangular control mode". In this modification, the definition of the two-MG frequency ratio (f1/f2), i.e. the ratio (f1/f2) of the first electrical frequency f1 to the second electrical frequency f2 in the above descriptions should be replaced with "the definition of the two-MG frequency ratio (f2/f1), i.e. the ratio (f2/f1) of the second electrical frequency f2 to the first electrical frequency f1.

The MG controller 20 of each embodiment includes the first execution and reset frequency-ratio ranges EFR1 and RFR1 as the first specific frequency-ratio range SFR1, and includes the second execution and reset frequency-ratio ranges EFR2 and RFR2 as the second specific frequency-ratio range SFR2. Then, the MG controller 20 switches drive of the first MG 3 between the usual drive and the specific drive according to the hysteresis characteristic of the relationship between the two-MG frequency ratio (f1/f2) and each of the usual drive and the specific drive has a hysteresis characteristic (see the operations in steps S12 to S15). The present disclosure is however not limited thereto.

Figure 14:
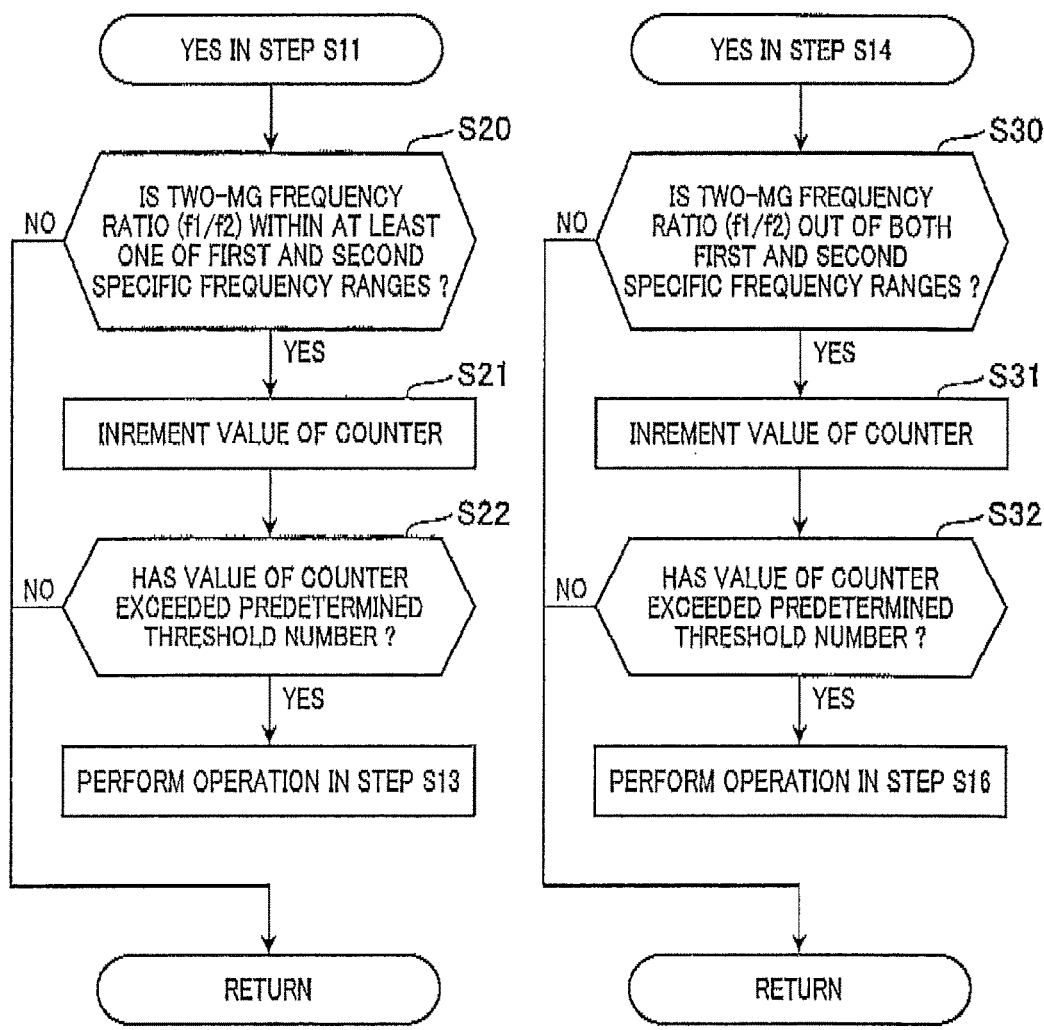
FIG. 14 is a flowchart schematically illustrating a modified update-cycle changing routine according to a modification of the first embodiment.

FIG. 14 illustrates a modified update-cycle changing routine carried out by the MG controller 20.

Specifically, referring to FIG. 14, upon affirmative determination in step S11, the MG controller 20 determines whether the two-MG frequency ratio (f1/f2) is within at least one of the first and second specific frequency-ratio ranges SFR1 and SFR2 in step S20.

Upon determination that the two-MG frequency ratio (f1/f2) is out of both the first and second specific frequency-ratio ranges SFR1 and SFR2 (NO in step S20), the MG controller 20 terminates the modified update-cycle changing routine, continuously executing the usual drive of the first MG 3.

Otherwise, upon determination that the two-MG frequency ratio (f1/f2) is within at least one of the first and second specific frequency-ratio ranges SFR1 and SFR2 (YES in step S20), the MG controller 20 increments a value of a previously prepared software or hardware counter by 1; the initial value of the counter is set to zero in step S21.

Following the operation in step S21, the MG controller 20 determines whether the value of the counter has exceeded a predetermined threshold number in step S22.

Upon determination that the value of the counter has not exceeded the predetermined threshold number (NO in step S22), the MG controller 20 terminates the modified update-cycle changing routine, continuously executing the usual drive of the first MG 3.

At that time, if the two-MG frequency ratio (f1/f2) is continuously located within at least one of the first and second specific frequency-ratio ranges SFR1 and SFR2, repeatedly executing the modified update-cycle changing routine results in the value of the counter has exceeded the predetermined threshold number. That is, upon determination that the value of the counter has exceeded the predetermined threshold number (YES in step S22), the MG controller 20 performs the operation in step S13, thus switching drive of the first MG 3 from the usual drive to the specific drive set forth above.

Similarly, upon affirmative determination in step S14, the MG controller 20 determines whether the two-MG frequency ratio (f1/f2) is out of both the first and second specific frequency-ratio ranges SFR1 and SFR2 in step S30.

Upon determination that the two-MG frequency ratio (f1/f2) is within at least one of the first and second specific frequency-ratio ranges SFR1 and SFR2 (NO in step S30), the MG controller 20 terminates the modified update-cycle changing routine, continuously executing the specific drive of the first MG 3.

Otherwise, upon determination that the two-MG frequency ratio (f1/f2) is out of both the first and second specific frequency-ratio ranges SFR1 and SFR2 (YES in step S30), the MG controller 20 increments a value of a previously prepared software or hardware counter by 1; the initial value of the counter is set to zero in step S31.

Following the operation in step S31, the MG controller 20 determines whether the value of the counter has exceeded a predetermined threshold number in step S32.

Upon determination that the value of the counter has not exceeded the predetermined threshold number (NO in step S32), the MG controller 20 terminates the modified update-cycle changing routine, continuously executing the specific drive of the first MG 3.

At that time, if the two-MG frequency ratio (f1/f2) is continuously out of both the first and second specific frequency-ratio ranges SFR1 and SFR2, repeatedly executing the modified update-cycle changing routine results in the value of the counter has exceeded the predetermined threshold number. That is, upon determination that the value of the counter has exceeded the predetermined threshold number (YES in step S32), the MG controller 20 performs the operation in step S16, thus switching drive of the first MG 3 from the specific drive to the usual drive set forth above.

Executing the modified update-cycle changing routine makes it possible to prevent hunting of the update cycle Trn, i.e. frequent switching) of the update cycle Trn between 0.5Tc and 1.5Tc, while the two-MG frequency ratio (f1/f2) is changing across the upper or lower limit of the first or second specific frequency-ratio range SFR1 or SFR2.

If such hunting of the update cycle Trn is negligible, the MG controller 20 switches drive of the first MG 3 from the usual drive to the specific drive in step S13 upon determination that the two-MG frequency ratio (f1/f2) is within at least one of the first and second specific frequency-ratio ranges SFR1 and SFR2 (YES in step S21). Similarly, if such hunting of the update cycle Trn is negligible, the MG controller 20 switches drive of the first MG 3 from the usual drive to the specific drive in step S16 upon determination that the two-MG frequency ratio (f1/f2) is out of both the first and second specific frequency-ratio ranges SFR1 and SFR2 (YES in step S31).

The MG controller 20 according to each of the first to third embodiments and their modifications is not limited to be used for hybrid vehicles each provided with an engine and first and second MGs. Specifically, the MG controller 20 according to each of the first to third embodiments and their modifications can be used for various vehicles or various systems, each of which is provided with two MGs to which electrical power based on a common system voltage is supplied from corresponding two inverters.

The MG controller 20 according to each of the first to third embodiments and their modifications can be used for various vehicles or systems, each of which is provided with three or more MGs to which electrical power based on a common system voltage is supplied from corresponding inverters. In this modification, the MG controller 20 can control drive of two MGs selected from the three or more MGs.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling at least first and second rotary electric machines, the apparatus comprising:
a PWM control unit configured to cyclically update a command voltage output to a first inverter to cause the first inverter to convert a common system voltage input thereto into a first AC voltage supplied to the first rotary electric machine according to a comparison between the command voltage and a cyclic carrier signal, thus driving the first rotary electric machine to operate in a PWM control mode based on current feedback;
a rectangular control unit configured to cause a second inverter to convert the common system voltage input thereto into a second AC voltage supplied to the second rotary electric machine, thus driving the second rotary electric machine to operate in a rectangular control mode based on torque feedback;

a determiner configured to determine whether a ratio of a first electrical frequency of the first rotary electric machine to a second electrical frequency of the second rotary electric machine is within a predetermined specific frequency-ratio range, the specific frequency-ratio range including 1/6n where n is an integer excluding zero; and an update-cycle controller configured to control an update cycle of the command voltage output to the first inverter according to a result of the determination by the determiner such that the update cycle during a specific drive of the first rotary electric machine is longer than the update cycle during a usual drive of the first rotary electric machine while a cycle of the carrier signal is maintained during both the usual drive and the specific drive of the first rotary electric machine, the specific drive of the first rotary electric machine representing drive of the first rotary electric machine while the ratio of the first electrical frequency to the second electrical frequency is within the specific frequency-ratio range, the usual drive of the first rotary electric machine representing drive of the first rotary electric machine while the ratio of the first electrical frequency to the second electrical frequency is out of the specific frequency-ratio range.

2. The apparatus according to claim 1, wherein the update-cycle controller is configured to control the update cycle of the command voltage output to the first inverter relative to the cycle of the carrier signal such that:

the update cycle is one half of the cycle of the carrier signal during the usual drive of the first rotary electric machine;

the update cycle is substantially any one of 1.5 times, 2.0 times, and 2.5 times longer than the cycle of the carrier signal during the specific drive of the first rotary electric machine.

3. The apparatus according to claim 2, wherein:
the first rotary electric machine is a multiphase rotary electric machine;
the cyclic carrier signal oscillates with positive and negative peaks;
the update cycle is substantially any one of 1.5 times and 2.5 times longer than the cycle of the carrier signal during the specific drive of the first rotary electric machine; and
the PWM control unit is configured to perform a feedback operation to calculate the command voltage for each phase of the first rotary electric machine based on current values of each phase of the first electrical machine sampled at alternate one of the positive and negative peaks of the carrier signal.

4. The apparatus according to claim 2, wherein:
the first rotary electric machine is a multiphase rotary electric machine;
the cyclic carrier signal oscillates with positive and negative peaks; and
the PWM control unit is configured to perform a feedback operation to calculate the command voltage for each phase of the first rotary electric machine based on an average value of current values of each phase of the first electrical machine sampled at adjacent positive and negative peaks of the carrier signal whenever the adjacent positive and negative peaks of the carrier signal appear.

5. The apparatus according to claim 2, wherein:
the determiner has:
a first frequency-ratio range used for determining whether the ratio of the first electrical frequency to the second electrical frequency is within the first frequency-ratio range as the specific frequency-ratio range during the usual drive of the first rotary electric machine, the first frequency-ratio range having an upper limit and a lower limit; and
a second frequency-ratio range used for determining whether the ratio of the first electrical frequency to the second electrical frequency is within the second frequency-ratio range as the specific frequency-ratio range during the specific drive of the first rotary electric machine, the second frequency-ratio range having an upper limit and a lower limit,
the upper limit of the second frequency-ratio range being set to be greater than the upper limit of the first frequency-ratio range, the lower limit of the second frequency-ratio range being set to be smaller than the lower limit of the first frequency-ratio range.

6. The apparatus according to claim 2, wherein:
the determiner is configured to:
cyclically determine whether the ratio of the first electrical frequency to the second electrical frequency is within the predetermined specific frequency-ratio range during the usual drive of the first rotary electric machine;
increment a first count each time it is determined that the ratio of the first electrical frequency to the second electrical frequency is within the specific frequency-ratio range;
determine whether the first count has exceeded a predetermined first threshold number;
cyclically determine whether the ratio of the first electrical frequency to the second electrical frequency is out of the predetermined specific frequency-ratio range during the specific drive of the first rotary electric machine;
increment a second count each time it is determined that the ratio of the first electrical frequency to the second electrical frequency is out of the specific frequency-ratio range; and
determine whether the second count has exceeded a predetermined second threshold number; and
the update-cycle controller is configured to:
switch the usual drive of the first rotary electric machine to the specific drive of the first rotary electric machine upon determination that the first count has exceeded the predetermined first threshold number; and
switch the specific drive of the first rotary electric machine to the usual drive of the first rotary electric machine upon determination that the second count has exceeded the predetermined second threshold number.

* * * * *